(12) United States Patent
Chen et al.

(10) Patent No.: US 12,462,255 B2
(45) Date of Patent: Nov. 4, 2025

(54) BLOCKCHAIN-BASED DATA PROCESSING METHOD AND APPARATUS, DEVICE, STORAGE MEDIUM, AND PROGRAM PRODUCT

(71) Applicant: Tencent Technology (Shenzhen) Company Limited, Shenzhen (CN)

(72) Inventors: Zimin Chen, Shenzhen (CN); Hui Zhang, Shenzhen (CN); Hu Lan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 226 days.

(21) Appl. No.: 18/209,175

(22) Filed: Jun. 13, 2023

(65) Prior Publication Data

US 2023/0325833 A1 Oct. 12, 2023

Related U.S. Application Data

(63) Continuation of application No. PCT/CN2022/130419, filed on Nov. 7, 2022.

(30) Foreign Application Priority Data

Jan. 11, 2022 (CN) .......................... 202210028536.9

(51) Int. Cl.
*G06Q 20/40* (2012.01)
*G06Q 20/02* (2012.01)

(52) U.S. Cl.
CPC ......... *G06Q 20/4014* (2013.01); *G06Q 20/02* (2013.01); *G06Q 20/405* (2013.01)

(58) Field of Classification Search
CPC ............................................. G06Q 20/00–425
See application file for complete search history.

(56) References Cited

U.S. PATENT DOCUMENTS

2013/0091089 A1 4/2013 Noureddine
2021/0082044 A1* 3/2021 Sliwka .................. H04L 9/3255

FOREIGN PATENT DOCUMENTS

CN 110163483 A 8/2019
CN 110221919 A 9/2019
(Continued)

OTHER PUBLICATIONS

Machine Translation of CN112991069A, Liu Zhihong, Tencent Technology (Shenzhen) Co., Ltd. (Published Jun. 18, 2021) (Year: 2021).*

(Continued)

*Primary Examiner* — Mohammad A. Nilforoush
(74) *Attorney, Agent, or Firm* — Morgan, Lewis & Bockius LLP

(57) ABSTRACT

This application discloses a blockchain-based data processing method performed by a computer device. The method includes: determining a token identification in response to a resource reception request; calling a general callback function in a smart contract of a blockchain and determining M virtual resources having the token identification issued by an issuing object in the blockchain; acquiring a resource attribute of the M virtual resources and determining a token attribute corresponding to the token identification based on the resource attribute of the M virtual resources, the issuing object holding a target virtual resource in the M virtual resources, and the M being a positive integer; and determining a resource identification of the target virtual resource transferred to a receiving object based on the token attribute of the token identification, the resource identifications corresponding to different token attributes being different.

17 Claims, 10 Drawing Sheets

(56) References Cited

FOREIGN PATENT DOCUMENTS

| CN | 111401867 A | 7/2020 |
|---|---|---|
| CN | 112991069 A | 6/2021 |

OTHER PUBLICATIONS

Tencent Technology, ISR, PCT/CN2022/130419, Jan. 16, 2023, 2 pgs.
Tencent Technology, WO, PCT/CN2022/130419, Jan. 16, 2023, 3 pgs.

* cited by examiner

BLOCKCHAIN-BASED DATA PROCESSING METHOD AND APPARATUS, DEVICE, STORAGE MEDIUM, AND PROGRAM PRODUCT

CROSS-REFERENCE TO RELATED APPLICATIONS

This application is a continuation application of PCT Patent Application No. PCT/CN2022/130419, entitled "BLOCKCHAIN-BASED DATA PROCESSING METHOD AND APPARATUS, DEVICE, STORAGE MEDIUM, AND PROGRAM PRODUCT" filed on Nov. 7, 2022, which claims priority to Chinese Patent Application No. 202210028536.9, entitled "BLOCKCHAIN-BASED DATA PROCESSING METHOD AND APPARATUS, DEVICE, STORAGE MEDIUM, AND PROGRAM PRODUCT" filed on Jan. 11, 2022, all of which is incorporated by reference in its entirety.

FIELD OF THE TECHNOLOGY

This application relates to the field of Internet and blockchain technologies, and in particular, to a blockchain-based data processing method and apparatus, a device, a storage medium, and a program product.

BACKGROUND OF THE DISCLOSURE

Because of the properties of decentralization and non-tampering, the blockchain technology can provide ownership proof with the virtual resources having the only property being the token type for various digital and physical items. Besides, the blockchain technology can store and distribute the items in a distributed way and other ways.

The smart contract described in the related art defines that each of the off-chain items may only issue a virtual resource on the blockchain. For example, the developer designs equipment in a game and may only perform the uplink processing on the ownership of one of 100 pieces of equipment based on the smart contract described in the related art. Obviously, the data processing efficiency based on the smart contract described in the related art is low, and the applicability of the smart contract is limited.

SUMMARY

The embodiments of this application provide a blockchain-based data processing method and apparatus, a computer device, a computer-readable storage medium, and a computer program product. As such, the applicability of the smart contract can be wider.

The embodiments of this application provide a blockchain-based data processing method performed by a computer device, including:
  determining a token identification in response to a resource reception request of a receiving object of a virtual resource, the resource reception request comprising an identification of an issuing object of the virtual resource;
  determining M virtual resources having the token identification issued by the issuing object in a smart contract of a blockchain;
  determining a token attribute corresponding to the token identification based on a resource attribute of the M virtual resources, M being a positive integer; and
  determining a resource identification of a target virtual resource transferred from the issuing object to the receiving object based on the token attribute of the token identification.

The embodiments of this application provide a computer device, including a processor, a memory, and a network interface,
  the processor being connected to the memory and the network interface, the network interface being configured to provide a data communication function, the memory being configured to store a computer program, and the processor being configured to call the computer program to cause the computer device to perform the method provided in the embodiments of this application.

The embodiments of this application provide a non-transitory computer-readable storage medium, storing a computer program therein, the computer program being loaded and executed by a processor of a computer device and causing the computer device to perform the method provided in the embodiments of this application.

The embodiments of this application have the following beneficial effects.

In the embodiments of this application, the token attribute of the token identification is determined based on the resource attribute of the M virtual resources. It can be seen that when the resource attributes of the M virtual resources are different, the token attributes determined based on the resource attributes are accordingly different, and therefore the determined resource identifications of the target virtual resources transferred to the receiving object are also different based on the determined token attributes. Obviously, in the embodiments of this application, distribution processing of the virtual resources with different resource attributes can be performed in a smart contract; therefore, the interoperability between the smart contract and the virtual resources with various different resource attributes can be realized. As such, the processing efficiency of the virtual resources in the blockchain and the applicability of the smart contract can be improved.

DESCRIPTION OF EMBODIMENTS

Figure 1:
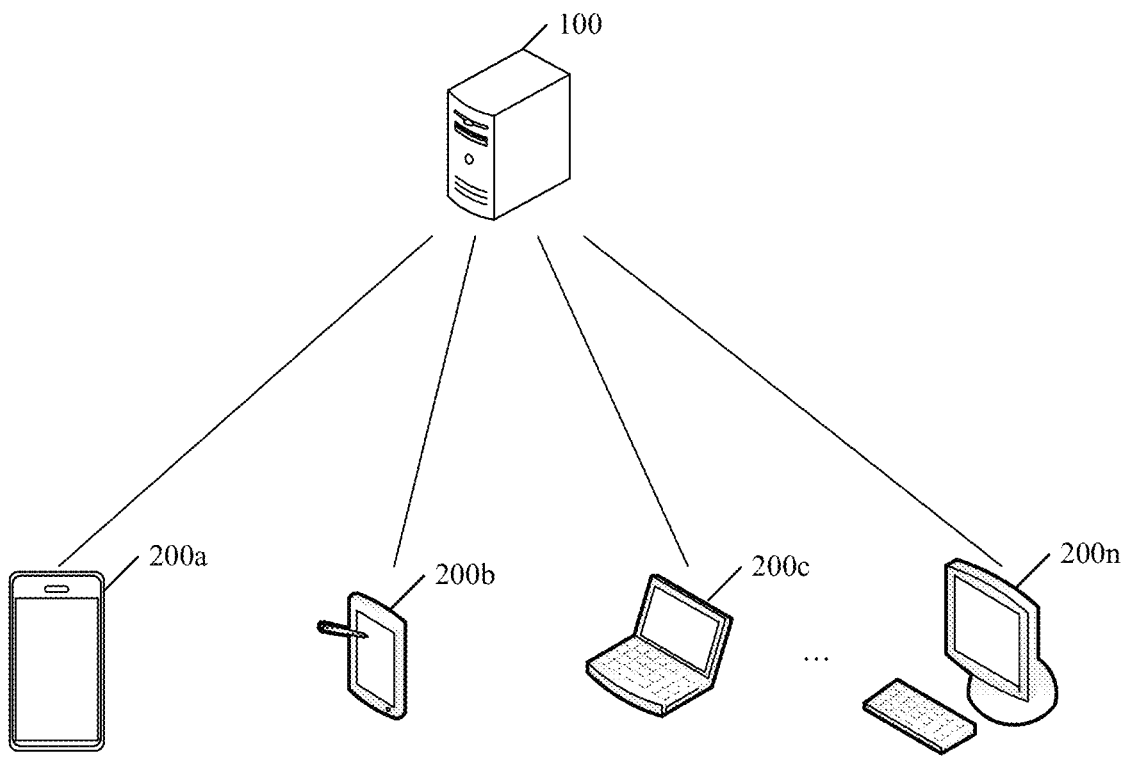
FIG. 1 is a schematic illustration of a system architecture provided in an embodiment of this application.

In conjunction with the drawings in the embodiments of this application, the technical solutions of the embodiments of this application will be clearly and completely described below. It is apparent that the embodiments described are only some, but not all embodiments of this application. Other embodiments can be obtained by those skilled in the art based on the embodiments of this application without creative work, which fall within the scope of protection of this application.

To facilitate understanding, some terms are briefly explained below.

1. Blockchain: in a narrow sense, a blockchain is a linked data structure with a block as a basic unit. Digital abstracts are used to check the transaction history acquired before in the block, which is suitable for meeting the needs of tamper-proof and extendibility under the distributed accounting scenario. In a broad sense, the blockchain also refers to distributed accounting techniques implemented in a blockchain structure, including distributed consensus, privacy and security protection, point-to-point communication techniques, network protocols, and smart contracts. The goal of the blockchain is to implement a distributed ledger of data records, and the ledger is only allowed to be added and not allowed to be deleted. The underlying basic structure of the ledger is a linear linked list. The linked list is composed of several "blocks" connected in series. The hash value of the preceding block is recorded in the succeeding block. Whether each block (and the transaction in the block) is legal can be quickly checked by calculating the hash value. If a node in the network recommends to add a new block, consensus confirmation on the block needs to be reached through a consensus mechanism.

2. Blockchain node: the blockchain network differentiate the nodes into consensus nodes (which may also be referred to as core nodes) and synchronization nodes (which may include data nodes and light nodes). The consensus node is responsible for the consensus service of the whole blockchain network; the synchronization node is responsible for synchronizing ledger information of the consensus node, i.e., synchronizing the latest block data. Whether the consensus node or the synchronization node, the internal structure of the node includes a network communication component. That is because the blockchain network is essentially a peer to peer (P2P) network, which needs to communicate with other nodes in the blockchain network by a P2P component. The resources and services in the blockchain network are distributed on respective nodes, and the transmission of information and the implementation of services are directly performed between the nodes without the intervention of intermediate links or centralized servers (third parties).

3. Public key and private key: a public key and a private key are a key pair (namely, a public key and a private key) obtained by an algorithm. The public key is a disclosed part of the key pair, and the private key is a non-disclosed part. The public key is usually used to encrypt data, verify digital signatures, and the like. It can be ensured that the obtained key pair is unique by this algorithm. When using this key pair, if a piece of data is encrypted with one of the keys, the data is decrypted with the other key. For example, if data is encrypted with the public key, the data is decrypted with the private key; if data is encrypted with the private key, the data is decrypted with the public key. Otherwise, the decryption will not be successful.

4. Block: it is a data packet carrying the transaction data on the blockchain network. Besides, it is a data structure marked with a time stamp and a hash value corresponding to a preceding block. The block is verified by the consensus mechanism of the network and determines the transactions in the block. The block includes a block header and a block body. The block header may record meta information of a current block, including data, such as a current version number, a hash value corresponding to a preceding block, a time stamp, a random number, and a hash value of a Merkel root. The block body may record detailed data generated over a period of time, including all transaction records or other information verified by the current block and generated during the creation of the block, which may be understood as a form of expression of the ledger.

5. Hash value: a hash value, also referred to as an information feature value or a feature value, is generated by converting input data with an arbitrary length into a password by a hash algorithm and performing a fixed output. The original input data cannot be retrieved by decrypting the hash value, and it is the one-way encryption function. In the blockchain, each block (except the initial block) includes the hash value of the preceding block, which is referred to as the parent block of the current block. The hash value is a potential core foundation and the most important aspect in the blockchain technology. It preserves the integrity of the blockchain as a whole and the authenticity of the recorded and viewed data.

6. Smart contract: it is a computer protocol intended to disseminate, verify, or execute contracts in an informative manner. In the blockchain system, the smart contract (contract for short) is a kind of code which can be understood and executed by each node of the blockchain. In addition, the smart contract can execute any logic and obtain a result. In the practical application, the smart contract are managed and tried out by trades on the blockchain. Each transaction is equivalent to a remote procedure call (RPC) request to the blockchain system. If the smart contract is equivalent to an executable program, the blockchain is equivalent to an operating system providing a runtime environment. The blockchain may include multiple contracts, differentiated by a contract identity (ID), an identification number, or a name. The governance consensus committee contract described below is a smart contract provided in an embodiment of this application for managing the consensus nodes, including recording the node states of the consensus nodes, dynamically adding the consensus nodes, and eliminating abnormal consensus nodes.

Reference may be made to FIG. 1. FIG. 1 is a schematic illustration of a system architecture provided in an embodiment of this application. As shown in FIG. 1, the system architecture may be a blockchain network, and the blockchain network may include a consensus network 101 and a synchronization network 102. The nodes in the synchronization network 102 may be referred to as synchronization nodes. The synchronization nodes mainly execute services, do not participate in accounting consensus, and obtain block data from the consensus network 101 by identity authentication. The consensus network 101 may also be referred to as a core network, and the nodes in the consensus network 101 may be referred to as consensus nodes, which have the full amount of data. The consensus network 101 and the synchronization network 102 can be in different network environments. Generally speaking, the consensus network 101 is in a private network, while the synchronization network 102 is in a common network. The two interact by a routing boundary.

It can be understood that the consensus network 101 described above may include one or more consensus nodes, and the number of the consensus nodes will not be limited herein. Referring back to FIG. 1, the consensus network 101 may include a consensus node 1011, a consensus node 1012 . . . a consensus node 1013.

It can be understood that the synchronization network 102 described above may include one or more synchronization nodes, and the number of the synchronization nodes will not be limited herein. Referring back to FIG. 1, the synchronization network 102 may include a synchronization node 1021, a synchronization node 1022, a synchronization node 1023 . . . a synchronization node 1024, and a synchronization node 1025.

Each node (including the consensus nodes in the consensus network 101 and the synchronization nodes in the synchronization network 102) may receive transaction data transmitted by a client in normal operation, generate a block based on the received transaction data, and then perform block uplink processing. It can be understood that in the specific implementations of this application, when the embodiments of this application are applied to a specific product or technology, the data related to the user data (e.g., the identification of the receiving object and the item identification) needs to obtain the user's permission or consent, and the receiving, use and processing of the relevant data need to comply with the relevant laws, regulations and standards of the relevant countries and regions.

In order to ensure the data interoperability between the respective nodes, there is a data connection between the respective nodes. For example, there is a data connection between the consensus node 1011 and the consensus node 1012, between the consensus node 1011 and the consensus node 1013, and between the synchronization node 1021 and the synchronization node 1023. In the practical application, there is a data connection between the consensus network 101 and the synchronization network 102. For example, there is a data connection between the consensus node 1011 and the synchronization node 1022 and between the consensus node 1012 and the synchronization node 1023.

It can be understood that data or block transmission can be performed between the nodes via the data connection described above. The data connection between the above nodes may be based on the node identifications. Each node in the blockchain network has a corresponding node identification, and each node described above can store the node identifications of other nodes having a connection relationship with itself. As such, the acquired data or the generated block is subsequently broadcasted to other nodes based on the node identifications of other blockchain nodes. For example, the consensus node 1011 may maintain a node identification list. The node identification list stores the node names and the node identifications of other nodes as shown in Table 1.

TABLE 1

| Node name | Node identification |
|---|---|
| Consensus node 1012 | 117.114.151.174 |
| Consensus node 1013 | 117.116.189.145 |
| . . . | . . . |
| Synchronization node 1021 | 117.114.151.183 |
| Synchronization node 1022 | 117.116.189.125 |
| Synchronization node 1023 | 119.250.485.362 |
| . . . | . . . |

The node identification can be an Internet Protocol (IP) address and any other information which can be used for identifying the nodes in the blockchain network, and Table 1 only takes the IP address as an example for explanation.

If the node identification of the consensus node 1011 is 117.116.156.425, the consensus node 1011 can transmit a data synchronization request to the synchronization node 1021 by the node identification 117.114.151.183, and the synchronization node 1021 can know that the data synchronization request is transmitted by the consensus node 1011 by the node identification 117.116.156.425. Similarly, the synchronization node 1023 can transmit transaction data A to the consensus node 1011 by the node identification 117.116.156.425, and the consensus node 1011 can know that the transaction data A is transmitted by the synchronization node 1023 by the node identification 119.250.485.362. The data transmission between other nodes is the same, so it will not be described in detail.

It can be understood that the above data connection is not limited to a connection way, may be directly or indirectly connected by a wired communication way, may be directly or indirectly connected by a wireless communication way, or may be connected by other connection ways, which is not limited in this application.

It can be understood that the blockchain nodes in the blockchain network of FIG. 1 include, but are not limited to, a terminal device or a server. The above server may be an independent physical server, may be a server cluster or a distributed system of a plurality of the physical servers, or may be a cloud server providing basic cloud computing services, such as cloud service, cloud database, cloud computing, cloud function, cloud storage, network service, cloud communication, middleware service, domain name service, security service, content delivery network (CDN), and big data and artificial intelligence (AI) platforms. The above terminal device includes, but is not limited to, a mobile phone, a computer, an intelligent voice interaction device, an intelligent household appliance, and a vehicle-mounted terminal. The terminal device and the server may be directly or indirectly connected by wired or wireless ways, which is not limited in the embodiments of this application.

Figure 2:
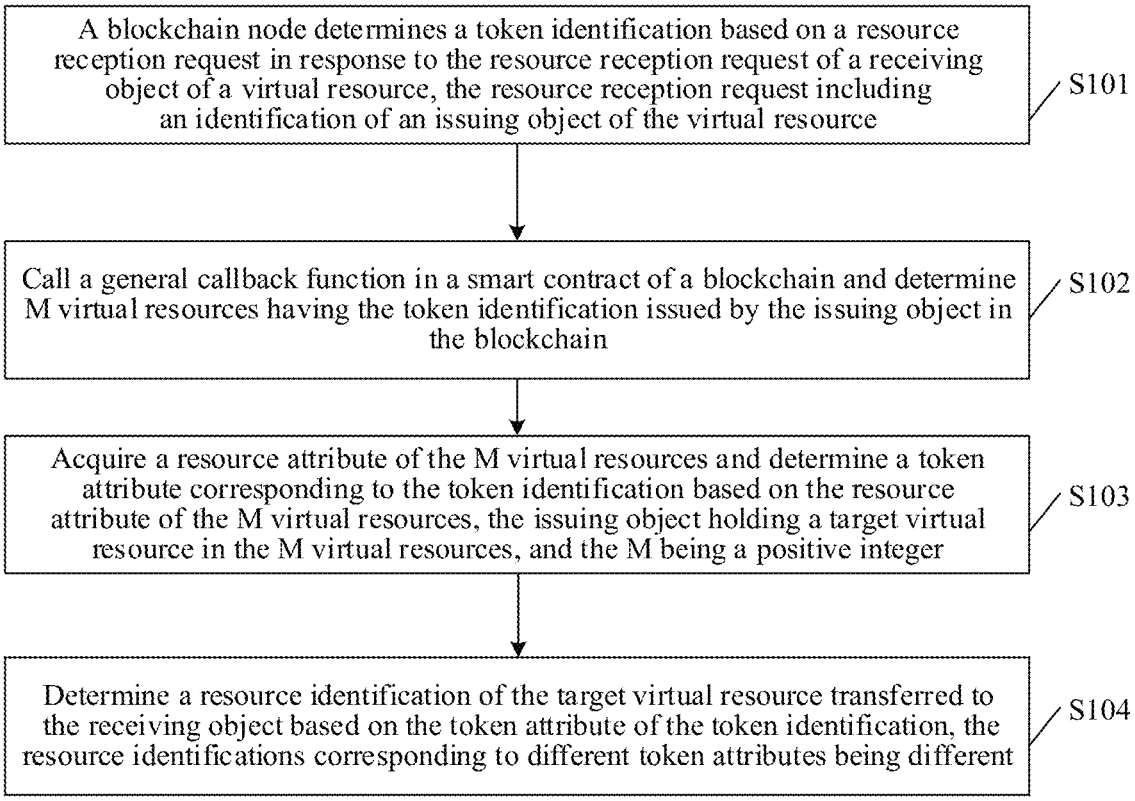
FIG. 2 is a flowchart of a blockchain-based data processing method provided in an embodiment of this application.

Reference may be made to FIG. 2. FIG. 2 is a flowchart of a blockchain-based data processing method provided in an embodiment of this application. The embodiments of this application may be applied to various scenarios including, but not limited to, cloud technology, AI, intelligent transportation, and assisted driving. The blockchain-based data processing method may be performed by a blockchain node (including the synchronization node and the consensus node in FIG. 1), and the blockchain node may be implemented by a computer device. As shown in FIG. 2, the blockchain-based data processing method may include at least the following steps S101-S104.

Step S101: A blockchain node determines a token identification based on a resource reception request in response to the resource reception request of a receiving object of a virtual resource, the resource reception request including an identification of an issuing object of the virtual resource.

The blockchain node acquires the resource reception request initiated by the receiving object and responds to the resource reception request. In some embodiments, the resource reception request may further include an identification of the receiving object in addition to the identification of the issuing object.

In some embodiments, the resource reception request may further include an item identification. The token identification associated with the item identification is acquired when the resource reception request includes the item identification. The token identification of M virtual resources is used for characterizing a token of an item having the item identification. A token identification set held by the issuing object is acquired when the resource reception request does not include the item identification, and the token identification is acquired from the token identification set.

Figure 3:
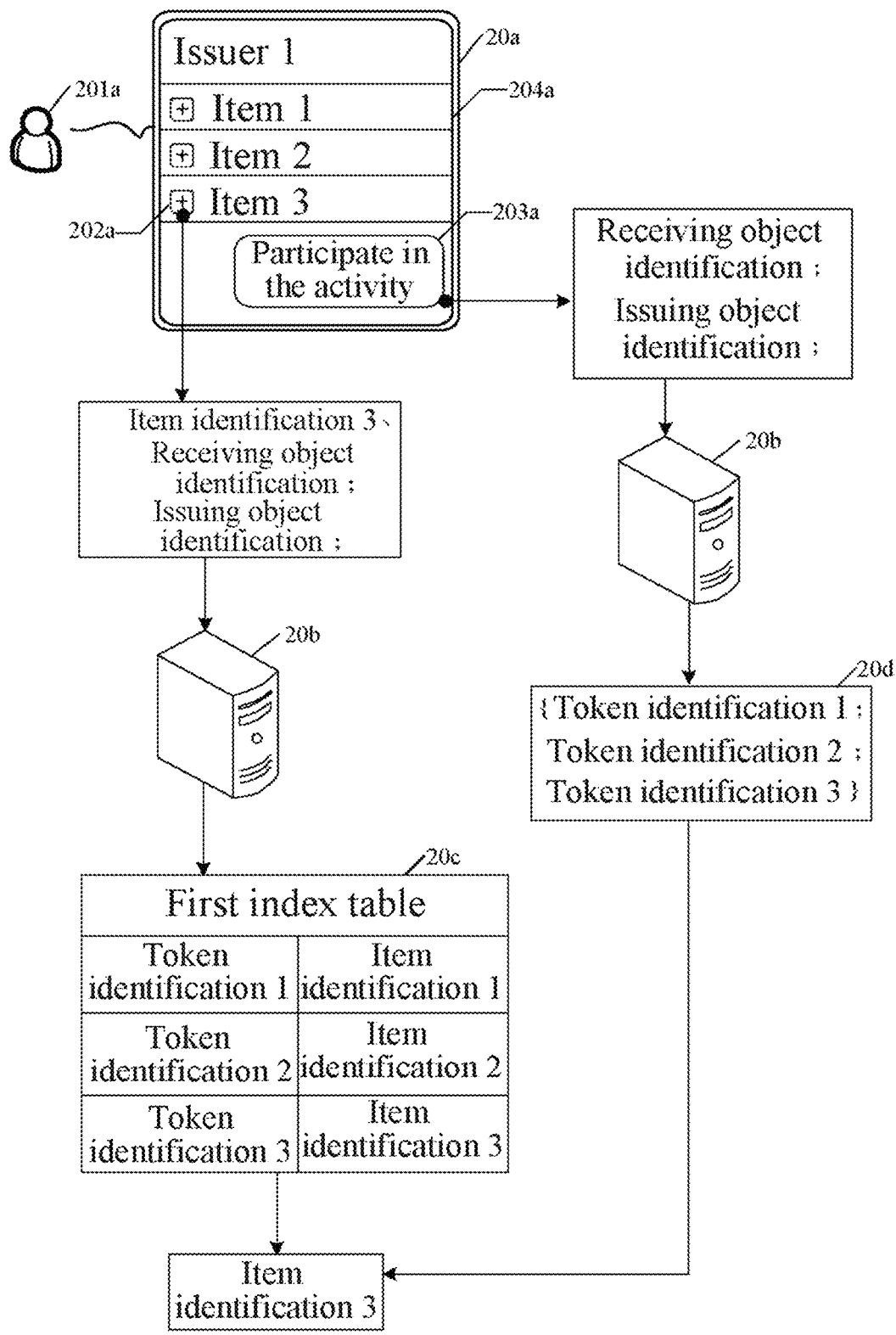
FIG. 3 is a schematic illustration of a scene for data processing provided in an embodiment of this application.

Reference may be made to FIG. 3. FIG. 3 is a schematic illustration of a scene for data processing provided in an embodiment of this application. A receiving object 201a may represent a receiving user operating a receiving node 20a. As shown in FIG. 3, the receiving node 20a may display an item display page 204a for an issuer 1, and the item display page 204a may display 3 items, such as an item 1, an item 2 and an item 3. It can be understood that in the embodiments of this application, to facilitate description and understanding, the schematic item display page 204a includes 3 items. In the practical application, the number of items that can be displayed on the item display page 204a may be any number. The item type of the item are not limited in the embodiments of this application. It may be a digital item, such as a video, music and game skin, and may also be a physical item, such as a piece of land and a house. The item type and the number of the items may be set according to the actual application scenarios.

In the embodiments of this application, two resource reception requests may be generated according to a scenario, and one resource reception request carries the item identification. To facilitate description, the resource reception request carrying the item identification is referred to as a first resource reception request. A resource reception request does not carry the item identification, to distinguish from the first resource reception request, the resource reception request not carrying the item identification is referred to as a second resource reception request. Referring to FIG. 3, if the receiving object 201a selects the item 3 in the item display page 204a, namely, receiving item 3, the receiving node 20a may respond to the trigger operation for a selection control 202a, generate the first resource reception request including an item identification 3, an identification of the receiving object and an identification of the issuing object, and transmit the resource reception request to a blockchain node 20b. The item identification may be the number of the item and any other information which can be used for only identifying the item. The identification of the receiving object can be an account of the receiving object 201a and any other information which can be used for only identifying the receiving object 201a. The identification of the issuing object can be an account of the issuing object (namely, the issuer 1) and any other information which can be used for only identifying the issuing object. The resource reception request (including the first resource reception request and the second resource reception request) is used for characterizing that the receiving object 201a applies for ownership of the receiving item (such as the item 3 illustrated in FIG. 3), i.e., the target virtual resource described below.

The blockchain node 20b acquires a first index table 20c after acquiring the first resource reception request. The embodiments of this application do not define the way to acquire the first index table 20c. The blockchain node 20b can acquire the first index table 20c from a local database and can also acquire the first index table 20c from the blockchain. As shown in FIG. 3, the first index table 20c may include an index key generated with a token identification and an index value generated with an item identification. The first index table may specifically include an item identification 1 of an item 1, a token identification 1 having an index relationship with the item identification 1, an item identification 2 of an item 2, a token identification 2 having an index relationship with the item identification 2, an item identification 3, and a token identification 3 having an index relationship with the item identification 3. The above token identification is used for characterizing the corresponding off-chain items and the identifications of the on-chain products in the blockchain network (characterizing the ownership of the items).

The blockchain node 20b may determine the token identification 3 having an indexing relationship with the item identification 3 from the first index table 20c. The above process describes a process in which the blockchain node 20b determines the token identification from the first resource reception request, and the process is suitable for the receiving object to determine the item to be received. The process in which the blockchain node 20b determines the token identification based on the second resource reception request is described below. The process is suitable for the receiving object not to determine the item to be received. For example, the receiving object participates in the activity created by the issuing object, and the issuing object determines the item to be distributed.

Referring back to FIG. 3, if the receiving object 201a triggers an item reception control (such as the participating activity control 203a illustrated in FIG. 3), the receiving node 20a generates the second resource reception request including the identification of the receiving object and the identification of the issuing object in response to the trigger operation for the item reception control and transmits the request to the blockchain node 20b. After acquiring the second resource reception request, the blockchain node 20b acquires a token identification set 20d held by the issuing object identification based on the request. As shown in FIG. 3, the token identification set 20d may include a token identification 1 corresponding to the item 1, a token identification 2 corresponding to the item 2, and a token identification 3 corresponding to the item 3. The blockchain node 20b has a random token identification from the token identification set 20d, such as the token identification 3 illustrated in FIG. 3.

It can be understood that the blockchain node 20b may include an issuing node corresponding to the issuer 1. For example, the receiving node 20a transmits the resource reception request to the issuing node.

It can be understood that the interfaces and controls shown in FIG. 3 are merely some reference expressions. In an actual service scenario, the developer can do relevant designs according to product requirements, and the embodiments of this application do not limit the forms of the interfaces and controls involved.

Step S102: Call a general callback function in a smart contract of a blockchain and determine M virtual resources having the token identification issued by the issuing object in the blockchain.

Step S103: Acquire a resource attribute of the M virtual resources and determine a token attribute corresponding to the token identification based on the resource attribute of the M virtual resources, the issuing object holding a target virtual resource in the M virtual resources, and the M being a positive integer.

In some embodiments, the resource reception request may further include a resource reception number. A reception permission of the receiving object for the token identification is verified; the resource reception number is compared with a first number threshold value when the reception permission is a permission allowing receiving (namely, the receiving object has the reception permission for the virtual resources), the permission allowing receiving being used for characterizing that the virtual resources having the token identification is not held by the receiving object; and the general callback function in the smart contract of the blockchain is called when the resource reception number is less than the first number threshold value.

N virtual resources having the token identification held by the issuing object is acquired in the blockchain, the N virtual resources belonging to the M virtual resources, and the N being a positive integer; reception failure information is returned to the receiving object, and resource reception end information is transmitted to the issuing object when the N is less than a second number threshold value; and the target virtual resource for being transferred to the receiving object is acquired from the N virtual resources when the N is equal to or greater than the second number threshold value.

It is determined that the token attribute corresponding to the token identification is a first token attribute when the resource attribute of the M virtual resources is a first resource attribute, the first resource attribute being used for characterizing that the M is equal to or greater than 2, and the M virtual resources having an only identification property; and it is determined that the token attribute corresponding to the token identification is a second token attribute when the resource attribute of the M virtual resources is a second resource attribute or a third resource attribute, the second resource attribute being used for characterizing that the M is equal to or greater than 2, the M virtual resources having a same identification property, and the third resource attribute being used for characterizing that the M is equal to 1.

Figure 4:
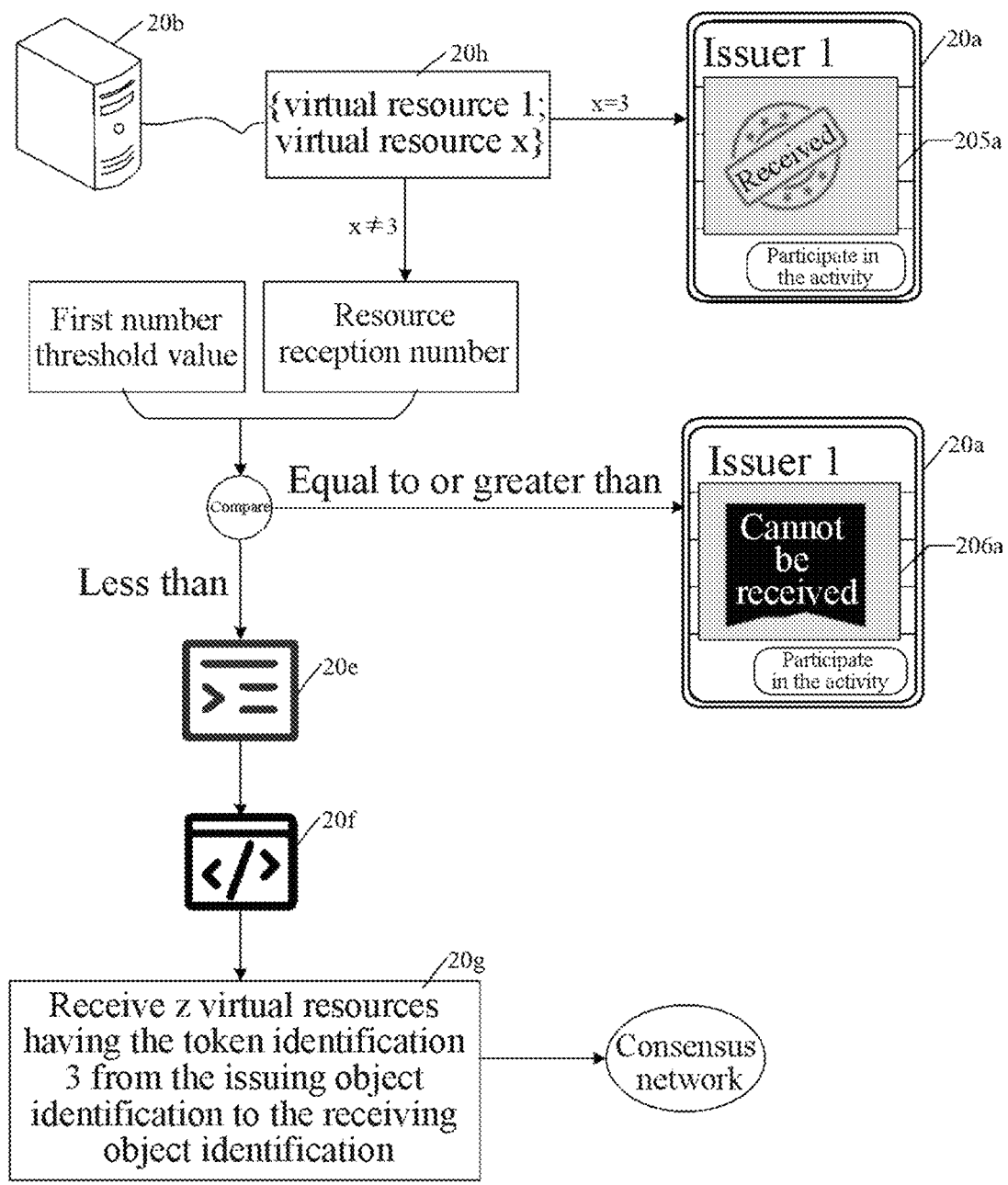
FIG. 4 is a schematic illustration of a scene for blockchain-based data processing provided in an embodiment of this application.

Reference may be made to FIG. 4. FIG. 4 is a schematic illustration of a scene for blockchain-based data processing provided in an embodiment of this application. As shown in FIG. 4, after determining the token identification, the blockchain node 20*b* will verify the reception permission of the identification of the receiving object for the token identification. In conjunction with the descriptions in FIG. 3 and FIG. 4, the blockchain node 20*b* acquires a received resource set 20*h* of the receiving object, and the received resource set 20*h* may include a virtual resource 1 corresponding to the item 1 and a virtual resource x. If x is equal to 3, the blockchain node 20*b* can determine that the receiving object receives the virtual resource 3 corresponding to the item 3. If the item is distributed, the ownership is required to be the only one. In a scenario where each receiving object can only receive one item. For example, a game developer gives a game skin to a game player for free during the activity. In the case where the blockchain node 20*b* determines that the receiving object receives the item 3, i.e., the receiving object holds the virtual resource 3 in the blockchain network, information of the item being received can be returned to the receiving node 20*a*. The receiving node 20*a* may then display a prompt page 205*a*. The prompt page 205*a* may display information of the item being received, as shown in FIG. 4.

If x is not equal to 3, the blockchain node 20*b* can determine that the receiving object does not hold the virtual resource 3 having the token identification 3. At this moment, the resource reception number in the resource reception request is compared with the first number threshold value. The first number threshold value can be set according to the actual application. If the resource reception number is equal to or greater than the first number threshold value, number excess information can be returned to the receiving node 20*a*. As shown in FIG. 4, the receiving node 20*a* can display a prompt page 206*a*. The prompt page 206*a* can display the number excess prompt information, such as "cannot be received". If the resource reception number is less than the first number threshold value, the blockchain node 20*b* may call the general callback function 20*f* in the smart contract 20*e*. Based on the callback function 20*f*, a resource reception transaction 20*g* is generated, namely, the transaction "receiving z virtual resources having the token identification 3 from the issuing object to the receiving object" illustrated in FIG. 4, where z represents the resource reception number. The resource reception transaction 20*g* is broadcasted to the consensus network so as to perform uplink processing on the transaction.

The scenario described above refers to that when an item is distributed, uniqueness is required for ownership. If uniqueness is not required for ownership, that is to say, a receiving object can receive a plurality of items, the receiving object can hold a plurality of virtual resources of an item in the blockchain network (i.e., a plurality of ownership of an item). Besides, the general callback function 20*f* can be directly called to generate a resource reception transaction, and the transaction can be broadcasted to the consensus network.

Figure 5:
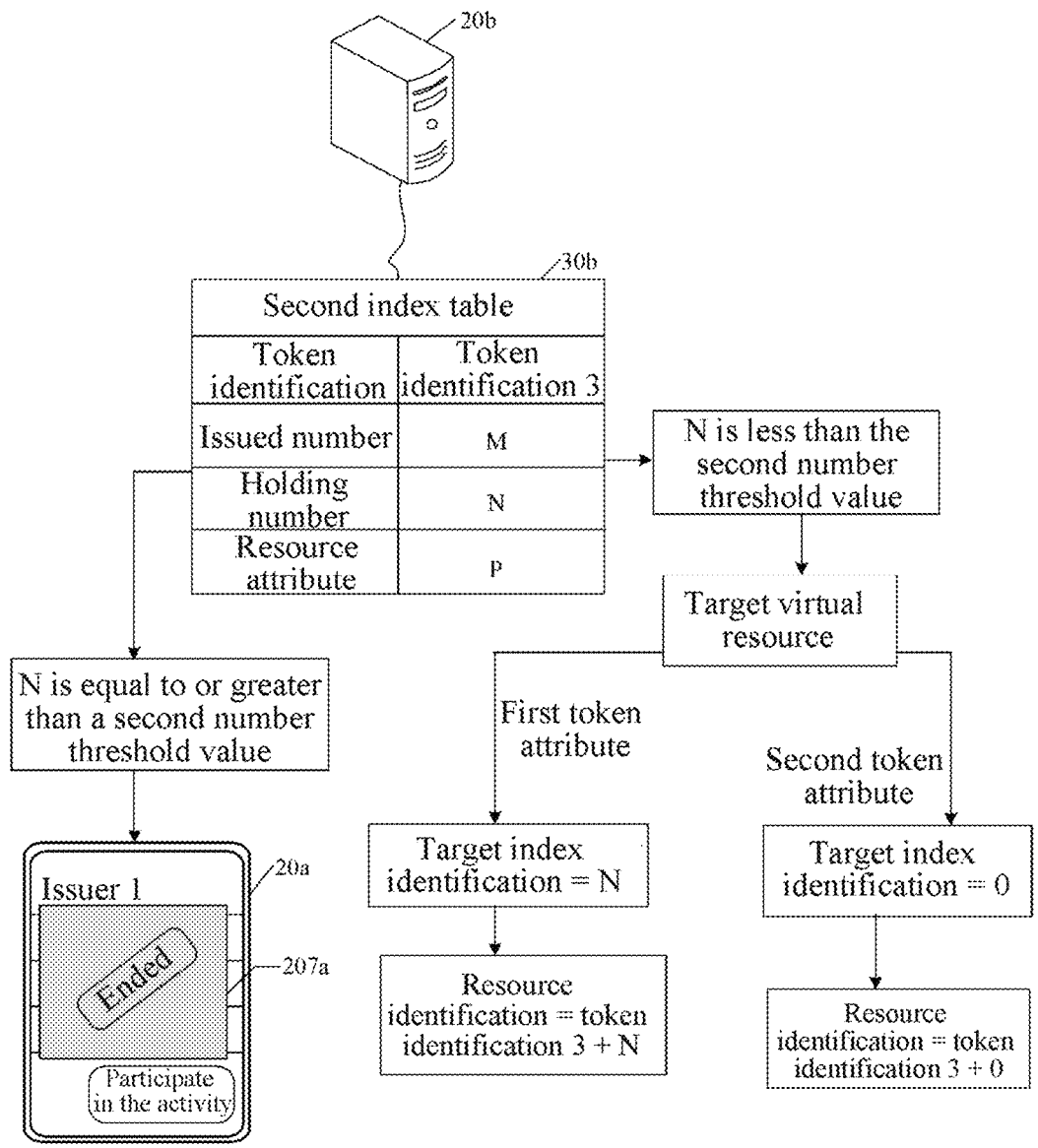
FIG. 5 is a schematic illustration of a scene for blockchain-based data processing provided in an embodiment of this application.

If the blockchain node 20*b* has the consensus permission, i.e., the blockchain node 20*b* is the consensus node, consensus can be performed on the above resource reception transaction. Reference may be made to FIG. 5. FIG. 5 is a schematic illustration of a scene for blockchain-based data processing provided in an embodiment of this application. In conjunction with the descriptions of FIG. 4 and FIG. 5, as shown in FIG. 5, by executing the general callback function 20*f*, the blockchain node 20*b* can acquire a second index table 30*b* corresponding to the issuing object. The second index table 30*b* may include an index key generated with the token identification, an index value generated with the issued number, an index value generated with a holding number, and an index value generated with the resource attribute. The issued number represents the total number of the virtual resources corresponding to the issuing object in issuing the item, and the virtual resources can be digital products. The holding number represents the number of the virtual resources currently held by the identification of the issuing object for the token identification 3, and the resource attribute represents the attribute of the virtual resources.

In the embodiments of this application, virtual resources with 3 different resource attributes can be included. If M is equal to 1, then it represents that the item has and has only one part, and the item has a third resource attribute. For example, a land has only one virtual resource (namely, land ownership). If M is equal to or greater than 2, it represents that there may be a plurality of the same items, namely, there may be a plurality of virtual resources. If the plurality of virtual resources have the same identification property, the virtual resources have a second resource attribute. For example, the game developer produces 10 same game skins and does not sort the 10 same game skins. If M is equal to or greater than 2, a plurality of virtual resources have the only identification property, and the plurality of virtual resources can separately have the only serial number, then the virtual resources have a first resource attribute. For example, the game developer produces 10 same game skins and sort the 10 same game skins to distinguish the 10 game skins. In this case, each game skin has the only serial number.

When the virtual resource 3 corresponding to the token identification 3 has the first resource attribute, the blockchain node 20*b* can determine that the token attribute corresponding to the token identification 3 is the first token attribute. When the virtual resource 3 has the second resource attribute or the second resource attribute, it can be determined that the token identification 3 has the second token attribute.

Referring back to FIG. 5, the blockchain node 20b acquires N virtual resources having the token identification 3 held by the issuing object in the blockchain and compares N with the second number threshold value. The second number threshold value can be set according to an actual application scenario. It is set as 1 in the embodiment of this application. If N is less than the second number threshold value (namely, 1), i.e., N is equal to 0, then the blockchain node 20b can determine that the issuing object does not hold the virtual resource corresponding to the token identification 3. It can also be understood that the issuing object distributes the item 3, and the issuing object does not hold the ownership of the item 3 in the blockchain network. The blockchain node 20b may return the reception failure information to the receiving node 20a (a node corresponding to the receiving object, namely, a node which logs in an account of the receiving object). The receiving node 20a may display a prompt page 207a, and the prompt page 207a may include the reception failure information, such as the information "ended" illustrated in FIG. 6. In addition, the blockchain node 20b may transmit the resource reception end information to the issuing node (a node corresponding to the issuing object, namely, a node registered with an account of the issuing object) so as to prompt the issuing object that the item is distributed completely. If N is equal to or greater than the second number threshold value and the resource attribute is the first resource attribute, the blockchain node 20b may acquire the target virtual resources for being transferred to the receiving object from the N virtual resources in an order, for example, acquiring the target virtual resources from small to large or from large to small. The blockchain node 20b can randomly acquire the target virtual resource from the N virtual resources when the N is equal to or greater than the second number threshold value, and the resource attribute is the second resource attribute. It can be understood that the process described above is a consensus process of the blockchain node 20b for the resource reception transaction.

Step S104: Determine a resource identification of the target virtual resource transferred to the receiving object based on the token attribute of the token identification, the resource identifications corresponding to different token attributes being different.

In some embodiments, the way of determining a resource identification of the target virtual resource transferred to the receiving object based on the token attribute of the token identification includes:

determining a target index identification for only identifying the target virtual resource based on the general callback function when the token attribute is a first token attribute and determining the resource identification of the target virtual resource transferred to an identification of the receiving object based on the token identification and the target index identification.

In the practical application, the N is determined as the target index identification for only identifying the target virtual resource based on a general callback function when the N is equal to or greater than the second number threshold value.

A general index identification is acquired based on the general callback function when the token attribute is a second token attribute, and the resource identification of the target virtual resource transferred to the receiving object is determined based on the token identification and the general index identification, the transferred virtual resources in the M virtual resources having a same general index identification.

In some embodiments, if the token attribute is the first token attribute, and N is equal to or greater than the second number threshold value, the blockchain node 20b determines N as the target index identification for only identifying the target virtual resource. For example, a serial number corresponding to the target virtual resource is taken as the target index identification. The blockchain node 20b determines the token identification 3 and the target index identification (N) as the resource identification of the target virtual resource. If the token attribute is the second token attribute, and N is equal to or greater than the second number threshold value, the blockchain node 20b determines the general index identification and the token identification as the resource identifications of the target virtual resource. The general index identification can be set according to an actual application scenario. It is set as 0 in FIG. 5. The process described above is also a consensus process of the blockchain node 20b for the resource reception transaction.

When the consensus of the resource reception transaction is completed, namely, determining the resource identification and the target virtual resource, an outgoing node in the consensus network generates a block to be uplinked according to the resource reception transaction. When the uplink of the block to be uplinked is successful, the consensus network can transfer the target virtual resource held by the issuing object to the receiving object.

In an embodiment of this application, the blockchain node may determine the token identification based on the resource reception request. Based on the general callback function, M virtual resources having the token identification issued by the issuing object can be determined in the blockchain. The token attribute corresponding to the token identification can be determined according to the resource attributes of the M virtual resources. If the token attribute is the first token attribute, the target index identification for only identifying the target virtual resource can be determined based on the general callback function. Then the resource identification of the target virtual resource transferred to the receiving object can be determined based on the token identification and the target index identification. In addition, if the token attribute is the second token attribute, the general index identification can be acquired based on the general callback function. Then the resource identification of the target virtual resource transferred to the receiving object can be determined based on the token identification and the general index identification. The transferred virtual resources in the M virtual resources have the same general index identification. It can be seen from the above that for different resource attributes, the embodiments of this application can determine different token attributes (such as the first token attribute and the second token attribute). For the virtual resources having different resource attributes, the corresponding index identifications (such as the target index identification or the general index identification) can be generated. Obviously, the embodiments of this application can distribute virtual resources having different resource attributes in the smart contract. Therefore, the interoperability between the smart contract and a plurality of virtual resources having different resource attributes can be realized. As such, the applicability of the smart contract can be improved, and the development cost of the smart contract can be saved.

Figure 6:
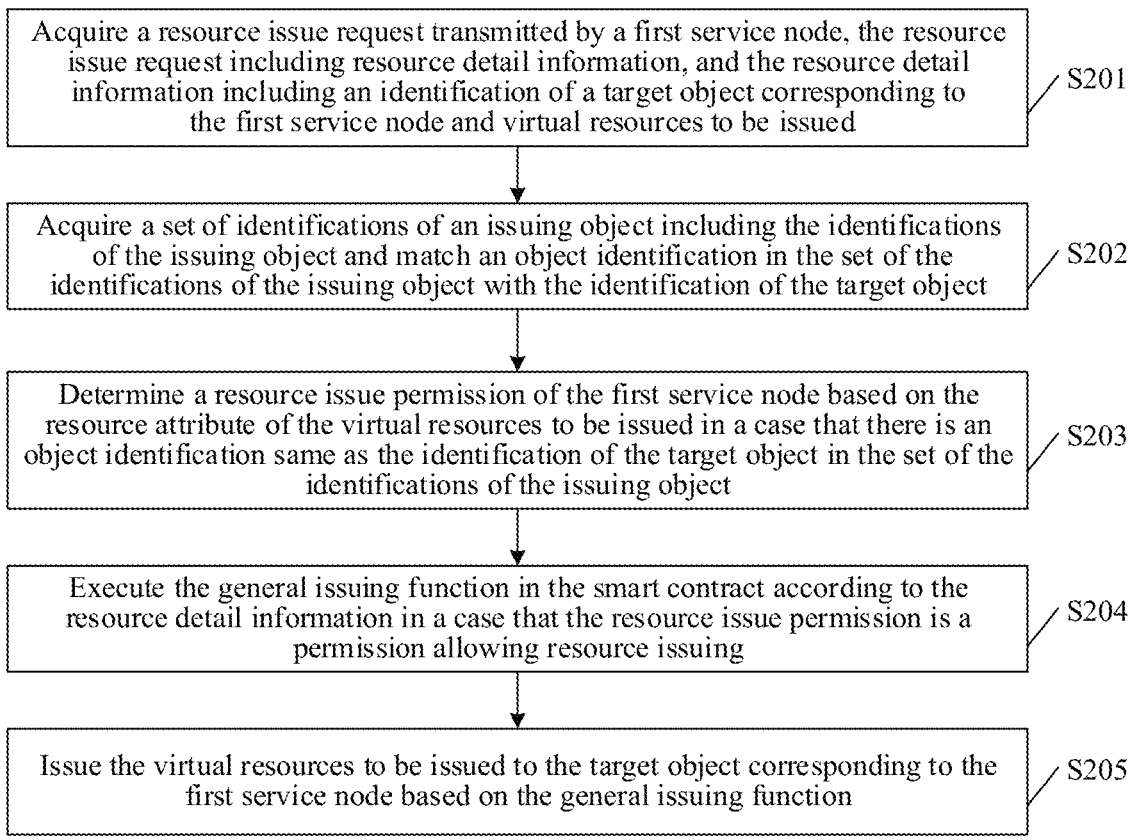
FIG. 6 is a flowchart of a blockchain-based data processing method provided in an embodiment of this application.

Reference may be made to FIG. 6. FIG. 6 is a flowchart of a blockchain-based data processing method provided in an embodiment of this application. The blockchain-based data processing method may be performed by a blockchain node (including the synchronization node and the consensus node in FIG. 1). As shown in FIG. 6, the blockchain-based data processing method may include at least the following steps S201-S205.

S201: Acquire a resource issue request transmitted by a first service node, the resource issue request including resource detail information, and the resource detail information including an identification of a target object corresponding to the first service node and virtual resources to be issued.

Figure 7:
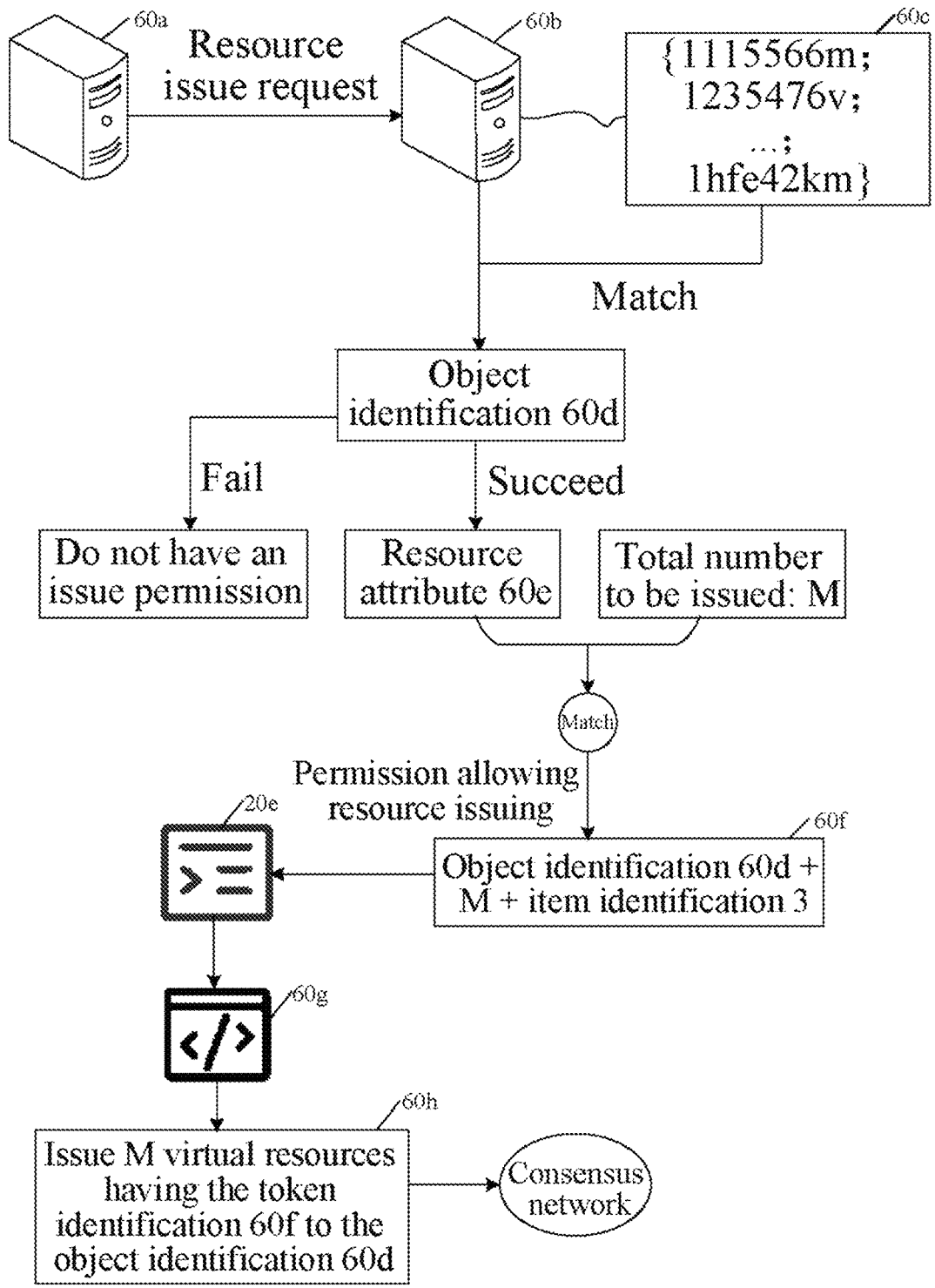
FIG. 7 is a schematic illustration of a scene for blockchain-based data processing provided in an embodiment of this application.

It can be understood that the virtual resource held by each issuing object in the blockchain network needs the issuing object to apply for issuing the virtual resource to its own object identification (e.g., a user account) in advance. Reference may be made to FIG. 7. FIG. 7 is a schematic illustration of a scene for blockchain-based data processing provided in an embodiment of this application. As shown in FIG. 7, a first service node $60a$ transmits a resource issue request to a blockchain node $60b$. The resource issue request is used for the first service node $60a$ to request the blockchain network to issue the virtual resources to be issued to the corresponding object identification. As shown in the object identification $60d$ shown in FIG. 7, data carried by the resource issue request can be set according to an actual application scenario.

For example, if the first service node $60a$ is the synchronization node in the blockchain network, then the first service node $60a$ may be equal to the blockchain node $60b$.

Step S202: Acquire a set of identifications of an issuing object including the identifications of the issuing object and match an object identification in the set of the identifications of the issuing object with the identification of the target object.

In the practical application, the blockchain node $60b$ acquires the set of the identifications of the issuing object $60c$ including the issuing object identifications based on the resource issue request. As shown in FIG. 7, the set of the identifications of the issuing object $60c$ may include a plurality of issuing object identifications, such as an issuing object identification 1115566m, an issuing object identification 1235476v . . . an issuing object identification 1hfe42 km. The embodiments of this application illustrates the issuing object identification with a hash value.

In the practical application, the blockchain node $60b$ matches the object identification in the set of the identifications of the issuing object $60c$ with the identification of the target object corresponding to the first service node (shown as the object identification $60d$ in FIG. 7).

Step S203: Determine a resource issue permission of the first service node based on the resource attribute of the virtual resources to be issued when there is an object identification same as the identification of the target object in the set of the identifications of the issuing object.

In the practical application, a total number of the virtual resource to be issued of the resource detail information is acquired. It is determined that the resource issue permission of the first service node is the permission allowing resource issuing when the resource attribute of the virtual resources to be issued is a target resource attribute, and the total number of the virtual resources to be issued is at least two, the target resource attribute including the first resource attribute or the second resource attribute. It is determined that the resource issue permission is the permission allowing resource issuing when the resource attribute of the virtual resources to be issued is the third resource attribute, and the total number of the virtual resources to be issued is one.

Referring back to FIG. 7, if there is no object identification same as the object identification $60d$ in the set of the identifications of the issuing object $60c$, namely, the matching fails, it can be determined that the object identification $60d$ does not have an issuing permission. For example, the object identification is not registered or registered, but when registering, the object type thereof is a common object identification type (for example, a receiving object type). The blockchain node $60b$ can prompt the first service node $60a$ to newly add an issuing object type so as to issue the virtual resources to be issued.

If the matching is successful, namely, there is the object identification same as the object identification $60d$ in the set of the identifications of the issuing object $60c$, for example, the issuing object identification 1hfe42 km is the same as the object identification $60d$, then the blockchain node $60b$ matches the resource attribute (illustrated as the resource attribute $60e$ in FIG. 7) of the virtual resources to be issued with the total number of the virtual resources to be issued (illustrated as M in FIG. 7). If the resource attribute $60e$ is the first resource attribute or the second resource attribute, but M is equal to 1, then the blockchain node $60b$ can determine that the first service node $60a$ has an error for the issuing information of the virtual resources to be issued, and the resource issue request does not comply with the issuing regulation. Then the resource issue request is returned. Similarly, if the resource attribute $60e$ is the third resource attribute, but M is equal to or greater than 2, then the blockchain node $60b$ rejects the resource issue request transmitted by the first service node.

If the resource attribute $60e$ is the first resource attribute or the second resource attribute, but M is equal to or greater than 2, then the blockchain node $60b$ determines that the resource issue permission of the first service node $60a$ for the virtual resources to be issued is a permission allowing resource issuing. Similarly, if the resource attribute $60e$ is the third resource attribute, but M is equal to 1, it can be determined that the resource issue permission of the first service node $60a$ for the virtual resources to be issued is the permission allowing resource issuing.

Step S204: Execute the general issuing function in the smart contract according to the resource detail information when the resource issue permission is a permission allowing resource issuing.

In the practical application, the token identification to be issued of the virtual resources to be issued is generated based on the identification of the target object corresponding to the first service node, item identification to be issued corresponding to the virtual resources to be issued and the total number. The general issuing function in the smart contract is executed based on the token identification to be issued, the identification of the target object corresponding to the first service node, the resource attribute of the virtual resources to be issued, and the total number.

Referring back to FIG. 7, when the resource issue permission of the first service node $60a$ for the virtual resources to be issued is the permission allowing resource issuing, the blockchain node $60b$ combines the object identification $60d$, the item identification to be issued corresponding to the virtual resources to be issued (namely, the identification corresponding to the off-chain item) and M into the token identification to be issued of the virtual resources to be issued (illustrated as the token identification $60f$ in FIG. 7). It can be understood that if the first service node corresponds to the issuing object in FIG. 2, and the virtual resources to be issued are equivalent to the virtual resources in FIG. 2 (the virtual resource 3 in FIG. 4), then the token identification 60*f* is equivalent to the token identification 3 in FIG. 3, and the item identification to be issued is equivalent to the item identification 3 in FIG. 3.

In some embodiments, the blockchain node 60*b* executes the general issuing function 60*g* in the smart contract 20*e* based on the token identification 60*f*, the object identification 60*d*, the resource attribute 60*e*, and M.

Step S205: Issue the virtual resources to be issued to the target object corresponding to the first service node based on the general issuing function.

In the practical application, the virtual resources to be issued having the number of virtual resources issued being the total number of the virtual resources to be issued and carrying the token identification to be issued is issued to the target object corresponding to the first service node based on the general issuing function.

Referring back to FIG. 7, the blockchain node 60*b* calls the general issuing function 60*g* to generate a resource issuing transaction 60*h*, as the transaction "issuing M virtual resources having the token identification 60*f* to the object identification 60*d*" illustrated in FIG. 7, and then the resource issuing transaction 60*h* is broadcasted to the consensus network. As such, the consensus node in the consensus network performs consensus on the transaction, and a block including the resource issuing transaction 60*h* is generated. When the block is successfully uplinked, the object identification 60*d* holds M virtual resources having the token identification 60*f*.

It can be seen from the above that in the embodiment of this application, the blockchain node can issue virtual resources having different resource attributes in the smart contract. Therefore, the interoperability between the smart contract and a plurality of virtual resources having different resource attributes can be realized. As such, the applicability of the smart contract can be improved, and the development cost of the smart contract can be saved.

Figure 8:
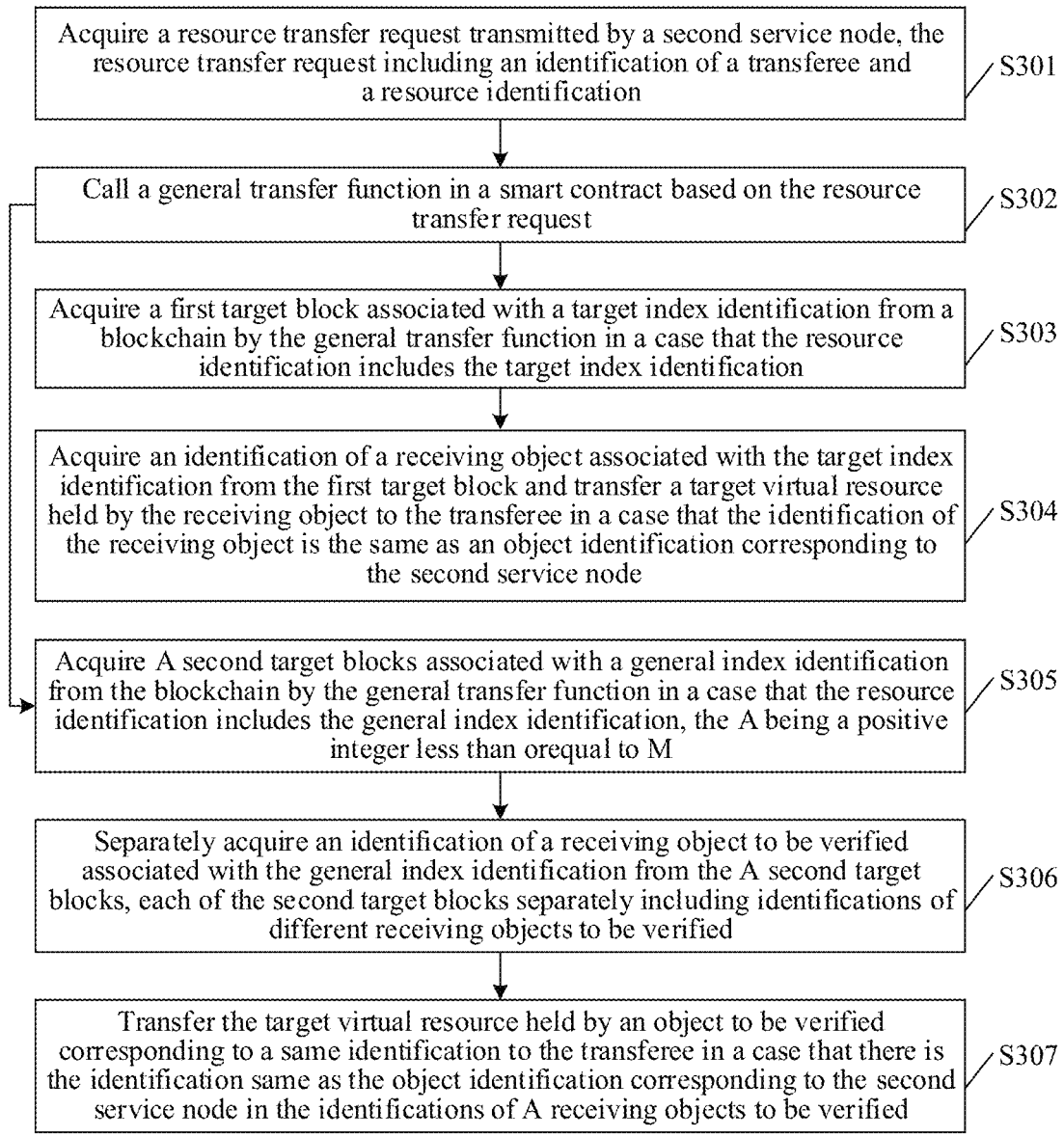
FIG. 8 is a flowchart of a blockchain-based data processing method provided in an embodiment of this application.

Reference may be made to FIG. 8. FIG. 8 is a flowchart of a blockchain-based data processing method provided in an embodiment of this application. The blockchain-based data processing method may be performed by a blockchain node (including the synchronization node and the consensus node in FIG. 1). As shown in FIG. 8, the blockchain-based data processing method may include at least the following steps S301-S307.

Step S301: Acquire a resource transfer request transmitted by a second service node, the resource transfer request including an identification of a transferee and a resource identification.

In the practical application, the blockchain node acquires the resource transfer request transmitted by the second service node, and then the blockchain node can determine the object identification corresponding to the second service node. The resource transfer request is used for characterizing, and the second service node requests the blockchain network to transfer the virtual resource having the resource identification held to the transferee.

Step S302: Call a general transfer function in a smart contract based on the resource transfer request.

In the practical application, the blockchain node calls the general transfer function in the smart contract to generate the resource transfer transaction. The resource transfer request includes the object identification corresponding to the second service node, the identification of the transferee and the resource identification, and the content thereof can be set according to an actual application scenario.

The blockchain node broadcasts the resource transfer transaction to the consensus network so that the consensus node in the consensus network performs consensus processing on the resource transfer transaction.

Step S303: Acquire a first target block associated with a target index identification from a blockchain by the general transfer function when the resource identification includes the target index identification.

In the practical application, the blockchain node may have a consensus permission, i.e., the blockchain node is a consensus node. The blockchain node may perform consensus processing on the resource transfer transaction. If the resource identification includes the target index identification, or the token attribute corresponding to the token identification included in the resource identification is the first token attribute, then the blockchain node can acquire the first target block associated with the target index identification from the blockchain. The first target block refers to a block associated with the target index identification and generating the largest time stamp.

Step S304: Acquire an identification of a receiving object associated with the target index identification from the first target block and transfer a target virtual resource held by the receiving object to the transferee when the identification of the receiving object is the same as an object identification corresponding to the second service node.

In the practical application, in conjunction with the embodiment corresponding to FIG. 2 above, the blockchain node needs to verify whether the object identification registered by the second service node is the identification of the receiving object. That is because in the embodiment corresponding to FIG. 2 above, the issuing object transfers the target virtual resource having the resource identification to the receiving object. The blockchain node acquires the identification of the receiving object associated with the target index identification from the first target block and transfers the target virtual resource held by the receiving object to the transferee when the identification of the receiving object is the same as an object identification corresponding to the second service node.

Step S305: Acquire A second target blocks associated with a general index identification from the blockchain by the general transfer function when the resource identification includes the general index identification, the A being a positive integer less than or equal to M.

Step S306: Separately acquire an identification of a receiving object to be verified associated with the general index identification from the A second target blocks, each of the second target blocks separately including identifications of different receiving objects to be verified.

Step S307: Transfer the target virtual resource held by an object to be verified corresponding to a same identification to the transferee when there is the identification same as the object identification corresponding to the second service node in the identifications of A receiving objects to be verified.

In conjunction with the descriptions of steps S305-S307, if the resource identification includes the general index identification, or the token attribute corresponding to the token identification included in the resource identification is the second token attribute, then the transferred virtual resources in the M virtual resources in the embodiment corresponding to FIG. 2 above have the same general index identification and thus have the corresponding resource identifications. Therefore, the blockchain node can acquire A second target blocks associated with the general index identification from the blockchain by the general transfer function, where A is equal to the number of the transferred virtual resources. The identifications of the objects to be verified which are separately included in the A second target blocks and hold the general index identification are different, and the identification of the object to be verified included in each second target block is the object identification of the receiving the virtual resource in the transfer relationship with the occurrence time stamp is the minimum time stamp in the transfer relationships corresponding to the virtual resources included in the block. For example, one second target block includes an identification of a first object to be verified and a target virtual resource held by the first object to be verified, and another second target block includes an identification of a second object to be verified and a target virtual resource held by the second object to be verified. If the transferred virtual resources include the first virtual resource, the first virtual resource is transferred from the issuing object to the first object, the first virtual resource is transferred from the first object to the second object, and then the first virtual resource is transferred from the second object to the third object, then it is recorded in the second target block in the blockchain that the third object (the object to be verified) holds the first virtual resource.

In some embodiments, the blockchain nodes separately acquire the identifications of the receiving objects to be verified associated with the general index identification from A second target blocks. If there is the identification same as the object identification corresponding to the second service node in the identifications of the A receiving objects to be verified, then the target virtual resource held by the receiving objects to be verified corresponding to the same identification is transferred to the transferee. If there is no identification same as the object identification corresponding to the second service node in the identifications of the A receiving objects to be verified, the blockchain node may determine that the object identification corresponding to the first service node does not hold the target virtual resource.

It can be seen from the above that in the embodiment of this application, the blockchain node can transfer virtual resources having different resource attributes in the smart contract. Therefore, the interoperability between the smart contract and a plurality of virtual resources having different resource attributes can be realized. As such, the applicability of the smart contract can be improved.

Figure 9:
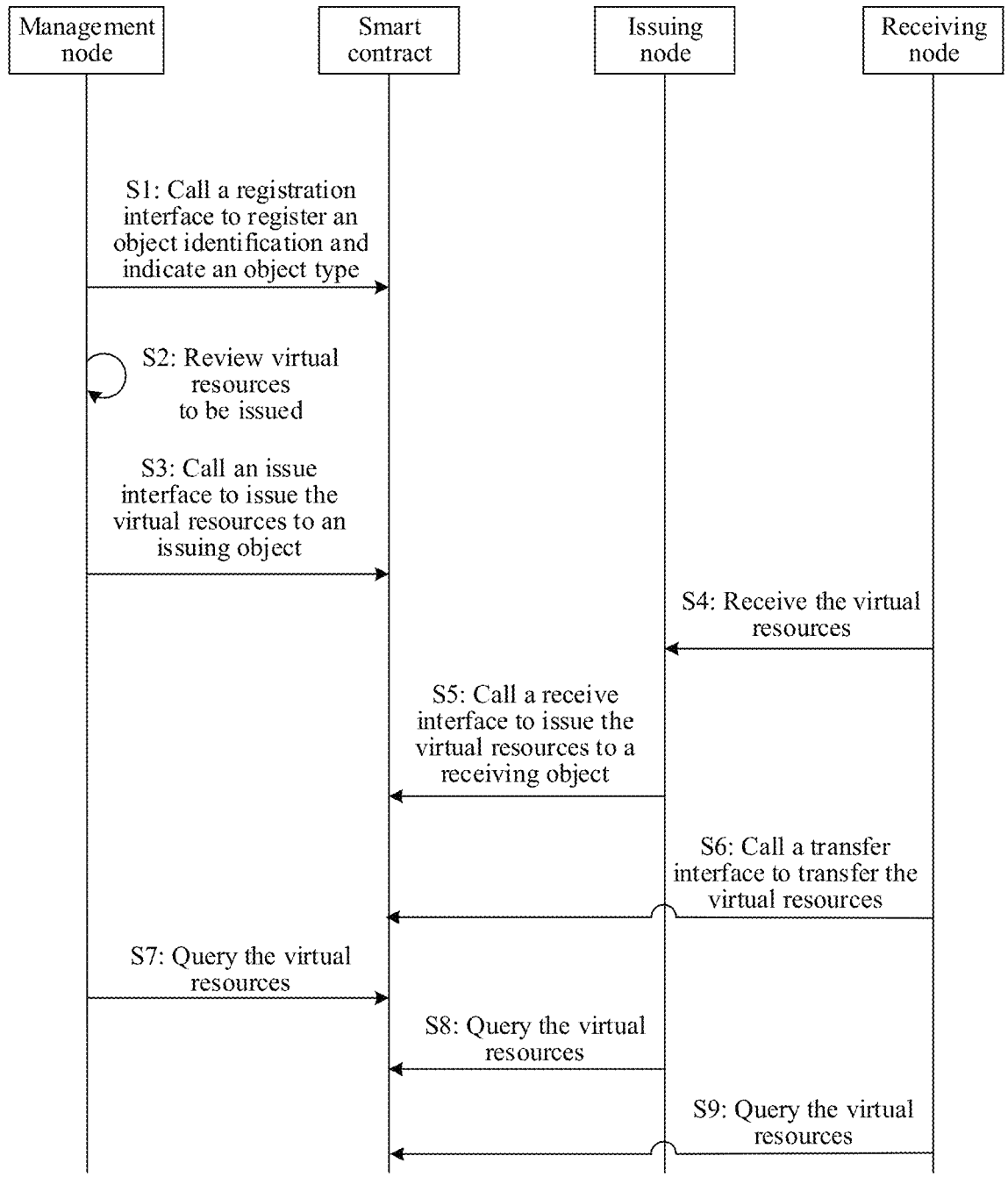
FIG. 9 is a flowchart of a blockchain-based data processing method provided in an embodiment of this application.

In some embodiments, reference may be made to FIG. 9. FIG. 9 is a flowchart of a blockchain-based data processing method provided in an embodiment of this application. The data processing method can be jointly executed by a management node and an issuing node, and a receiving node. The management node, the issuing node, and the receiving node all can be the blockchain node in FIG. 1. As shown in FIG. 9, the data synchronization process includes the following steps.

Step S1: Call a registration interface to register an object identification and indicate an object type.

In the practical application, the management node acquires an object registration request transmitted by a third service node, the object registration request including an object identification corresponding to the third service node, an identification address corresponding to the third service node, and an object type; calls a general registration function in the smart contract based on the object registration request; determines the object identification corresponding to the third service node as the identification of the issuing object when the object type is an issuing object type and stores the identification of the issuing object and the identification address corresponding to the third service node in association in the blockchain based on the general registration function identifying the object type; and determines that the object identification corresponding to the third service node is an identification of the receiving object when the object type is a receiving object type and stores the identification of the receiving object and the identification address corresponding to the third service node in association in the blockchain.

The nodes in the embodiments of this application can be divided into 3 types, namely, a management node, an issuing node, and a receiving node. The management node has a permission to register an object. The management node can call a register-user interface of the smart contract on the blockchain, namely, calling the above general registration function to perform on-chain object registration on the issuing object and the receiving object, and indicate the object type of the registration object. The object type may include an issuing object type and a receiving object type. The above process can be implemented by the code in Table 2. Table 2 is a schematic code table for a management node and registration object provided in an embodiment of this application.

TABLE 2

Setting management node address and management node permission
address: node address of management node
function set Master Address (address)
Registration object identification and management node permission
uin: object identification of registration object
addresses: addresses of the setting objects in the format 'address1 and address2'
type: object type (issued or received)
function register User (uin, addresses, and type)

It can be understood that in an actual application scenario, one object identification can both issue a virtual resource and receive the issued virtual resources issued by other object identifications.

Step S2: Review virtual resources to be issued.

In the practical application, the issuing node (a node registered with an account of an issuing object) submits the virtual resources to be issued which needs to be issued to the management node, and the management node reviews an issued asset and checks whether the issued asset complies with the requirements for issuing.

Step S3: Call an issue interface to issue the virtual resources to an issuing object.

In the practical application, the management node confirms that the virtual resources to be issued comply with the regulatory requirements, and then the management node calls the issue interface in the smart contract, i.e., calling the general issuing function, transmitting a token identification (tokenID) and the number of the issued asset to the issuing object of issuing the asset, and issuing the virtual resource having the token identification for the issuing object. The above process can be implemented by the code in Table 3. Table 3 is a schematic code table for a management node to issue virtual resources to the issuing object.

TABLE 3

Issuing virtual resources and management node permission
tokenJsonInfo: {
  issuer: issuing object identification
  tokenID: token identification TABLE 3-continued tokenAttributes: resource attribute value
Amount: number of issued virtual resources
}
tokenUriType: format of files stored in metaData
tokenUri: metaData of virtual resources
function issue digital product (tokenJsonInfo, tokenUriType, and tokenUri)

Step S4: Receive the virtual resources.

In the practical application, the receiving node (a node registered with an account of a receiving object) initiates a resource reception request and transmits the request to the issuing node.

Step S5: Call a receive interface to issue the virtual resources to a receiving object.

In the practical application, the issuing node receives the resource reception request transmitted by the receiving node and confirms the node identity of the receiving node. After confirming that the receiving node has the permission allowing receiving, the issuing node calls the smart contract receive interface, i.e., calling the general receiving function. The detailed description of this step may refer to the description in the embodiment corresponding to FIG. 2 above, and this process can be implemented by the code in Table 4. Table 4 is a schematic code table for a receiving node to distribute virtual resources to the receiving object provided in an embodiment of this application.

TABLE 4

Acquiring virtual resources and issuing node permission
fromUin: issuing object identification
toUin: identification of the receiving object
tokenID: token identification
amount: number of transferred virtual resources
function receive (fromUin, toUin, tokenID, and amount)

In an embodiment of this application, the format of the tokenID and the resource identification (assetID) is specified below.

tokenID=issuing object identification+split_char+item identification+split_char+amount
assetID=issuing object identification+split_char+item identification+split_char+amount+split_char+index Step S6: Call a transfer interface to transfer the virtual resources.

In the practical application, after the receiving object owns the virtual resources, the receiving object can call the transfer interface on the owned virtual resources for asset transfer, and the detailed description may refer to the description of the embodiment corresponding to FIG. 6 above. The process can be implemented by the code in Table 5, and Table 5 is a schematic code table for transferring virtual resources provided in an embodiment of this application.

TABLE 5

Transferring virtual resources and asset owner fromUin permission
fromUin: object identification holding virtual resources
toUin: transferee identification
tokenID: token identification
index: index identification
amount: number of transferred virtual resources
function transfer (fromUin, toUin, tokenID, index, and amount)

Steps S7, S8, and S9: Query the virtual resources.

In the practical application, a resource query request transmitted by a query object is acquired, the resource query request including the resource identification; a general resource query function in the smart contract is called based on the resource query request; a resource query permission of the query object is determined based on the general resource query function; and resource circulation information for the target virtual resource is returned to the query object when the resource query permission is a permission allowing resource querying, the permission allowing resource querying being used for indicating that the query object is the receiving object or an object corresponding to a consensus node in the blockchain.

The management node, the issuing node, and the receiving node all can query the virtual resource information on the blockchain, and the process can be implemented by the code in Table 6. Table 6 is a schematic code table for querying virtual resources provided in an embodiment of this application.

TABLE 6

Querying information of the tokenID, management node, and platform object registrant permission
tokenID: token identification
function tokenUri (tokenID)

The consensus node in the blockchain network and the object holding the virtual resources can verify the circulation situation of the virtual resources on the blockchain, and the process can be implemented by the code in Table 7. Table 7 is a schematic code table for querying resource circulation information of a target virtual resource provided in an embodiment of this application.

TABLE 7

Querying circulation information of virtual resources, management node, and asset owner permission
uin: object identification
tokenID: token identification
index: tokenID index identification
function balanceOf (uin, tokenID, and index)

In an embodiment of this application, the blockchain node may determine the token identification based on the resource reception request. In some embodiments, based on the general callback function, M virtual resources having the token identification issued by the issuing object can be determined in the blockchain. The token attribute corresponding to the token identification can be determined according to the resource attributes of the M virtual resources. In some embodiments, if the token attribute is the first token attribute, the target index identification for only identifying the target virtual resource can be determined based on the general callback function. Then the resource identification of the target virtual resource transferred to the receiving object can be determined based on the token identification and the target index identification. In addition, if the token attribute is the second token attribute, the general index identification can be acquired based on the general callback function. Then the resource identification of the target virtual resource transferred to the receiving object can be determined based on the token identification and the general index identification. The transferred virtual resources in the M virtual resources have the same general index identification. It can be seen from the above that for different resource attributes, the embodiments of this application can determine different token attributes (such as the first token attribute and the second token attribute). For the virtual resources having different resource attributes, the corresponding index identifications (such as the target index identification or the general index identification) can be generated. Obviously, the embodiments of this application can distribute virtual resources having different resource attributes in the smart contract. Therefore, the interoperability between the smart contract and a plurality of virtual resources having different resource attributes can be realized. As such, the applicability of the smart contract can be improved.

Figure 10:
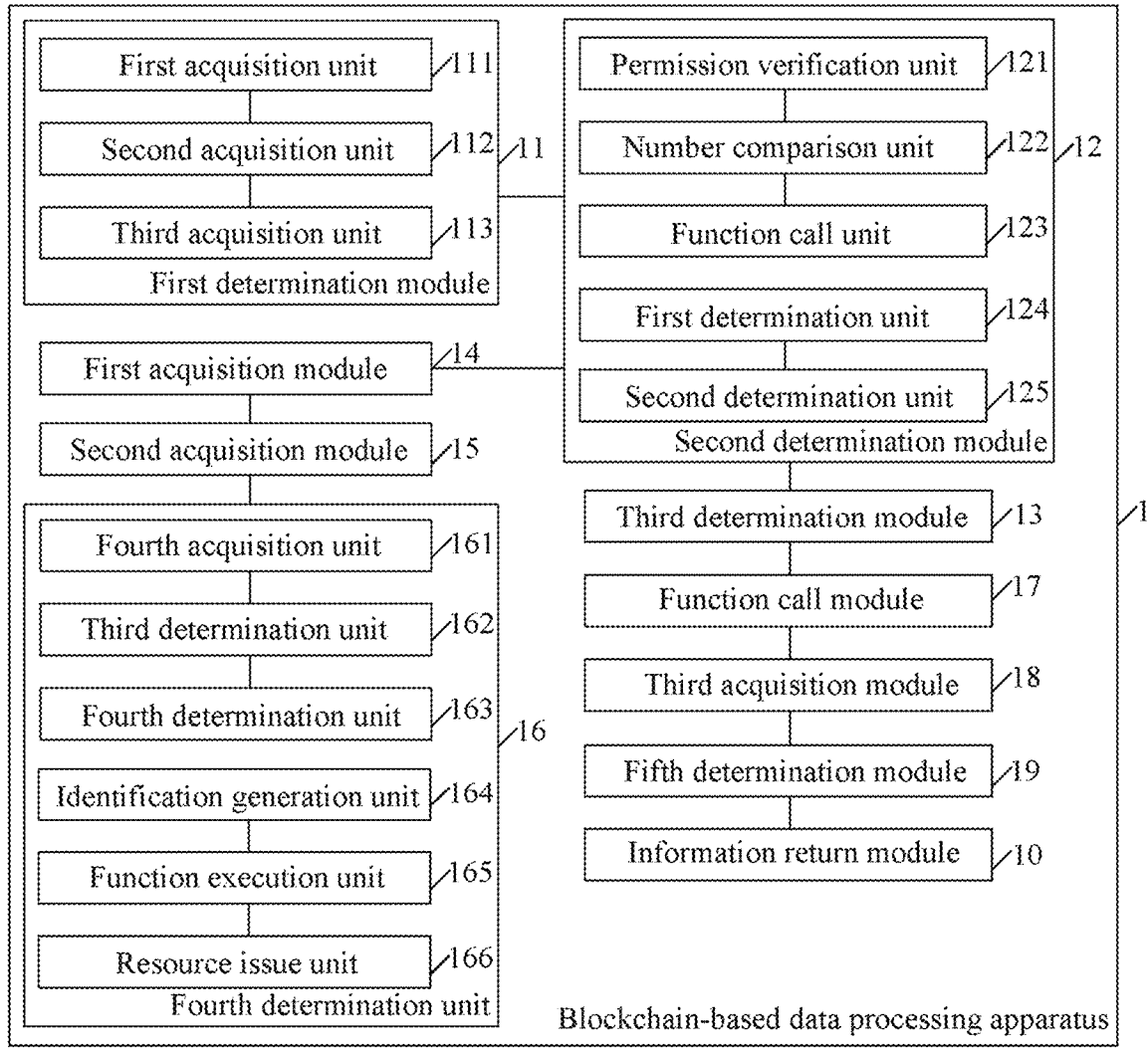
FIG. 10 is a schematic structural diagram of a blockchain-based data processing apparatus provided in an embodiment of this application.

In some embodiments, reference may be made to FIG. 10. FIG. 10 is a schematic structural diagram of another blockchain-based data processing apparatus provided in an embodiment of this application. The above blockchain-based data processing apparatus may be a computer program (including a program code) running on a computer device. For example, the blockchain-based data processing apparatus is application software. The apparatus may be configured to perform the respective steps in the method provided in the embodiments of this application. As shown in FIG. 10, the blockchain-based data processing apparatus 1 may include: a first determination module 11, a second determination module 12, and a third determination module 13.

The first determination module 11 is configured to determine a token identification based on a resource reception request in response to the resource reception request of a receiving object of a virtual resource, the resource reception request including an identification of an issuing object of the virtual resource.

The second determination module 12 is configured to call a general callback function in a smart contract of a blockchain and determine M virtual resources having the token identification issued by the issuing object in the blockchain, and configured to acquire a resource attribute of the M virtual resources and determine a token attribute corresponding to the token identification based on the resource attribute of the M virtual resources, the issuing object holding a target virtual resource in the M virtual resources, and the M being a positive integer.

The third determination module 13 is configured to determine a resource identification of the target virtual resource transferred to the receiving object based on the token attribute of the token identification, the resource identifications corresponding to different token attributes being different.

In some embodiments, the third determination module 13 is further configured to determine a target index identification for only identifying the target virtual resource based on the general callback function when the token attribute is a first token attribute and determine the resource identification of the target virtual resource transferred to an identification of the receiving object based on the token identification and the target index identification.

The third determination module 13 is further configured to acquire a general index identification based on the general callback function when the token attribute is a second token attribute and determine the resource identification of the target virtual resource transferred to the receiving object based on the token identification and the general index identification, the transferred virtual resources in the M virtual resources having a same general index identification.

In some embodiments, the first determination module 11 may include: a first acquisition unit 111, a second acquisition unit 112 and, a third acquisition unit 113.

The first acquisition unit 111 is configured to acquire the resource reception request initiated by the receiving object.

The second acquisition unit 112 is configured to acquire the token identification associated with an item identification when the resource reception request includes the item identification, the M virtual resources being used for characterizing a token of an item having the item identification.

The third acquisition unit 113 is configured to acquire a token identification set held by the issuing object when the resource reception request does not include the item identification and acquire the token identification from the token identification set.

In some embodiments, the resource reception request may further include a resource reception number.

The second determination module 12 may include: a permission verification unit 121, a number comparison unit 122, and a function call unit 123.

The permission verification unit 121 is configured to verify a reception permission of the receiving object for the token identification.

The number comparison unit 122 is configured to compare the resource reception number with a first number threshold value when the reception permission is a permission allowing receiving, the permission allowing receiving being used for characterizing that the virtual resources having the token identification is not held by the receiving object.

The function call unit 123 is configured to call the general callback function in the smart contract when the resource reception number is less than the first number threshold value.

In some embodiments, the blockchain-based data processing apparatus 1 may further include a first acquisition module 14.

The first acquisition module 14 is configured to acquire N virtual resources having the token identification held by the issuing object in the blockchain, the N virtual resources belonging to the M virtual resources, and the N being a positive integer.

The first acquisition module 14 is further configured to return reception failure information to the receiving object and transmit resource reception end information to the issuing object when the N is less than a second number threshold value.

The first acquisition module 14 is further configured to acquire the target virtual resource for being transferred to the receiving object from the N virtual resources when the N is equal to or greater than the second number threshold value.

The third determination module 13 is further configured to determine the N as the target index identification for only identifying the target virtual resource based on the general callback function when the N is equal to or greater than the second number threshold value.

In some embodiments, the second determination module 12 may include: a first determination unit 124 and a second determination unit 125.

The first determination unit 124 is configured to determine that the token attribute corresponding to the token identification is a first token attribute when the resource attribute of the M virtual resources is a first resource attribute, the first resource attribute being used for characterizing that the M is equal to or greater than 2, and the M virtual resources having an only identification property.

The second determination unit 125 is configured to determine that the token attribute corresponding to the token identification is a second token attribute when the resource attribute of the M virtual resources is a second resource attribute or a third resource attribute, the second resource attribute being used for characterizing that the M is equal to or greater than 2, the M virtual resources having a same identification property, and the third resource attribute being used for characterizing that the M is equal to 1.

In some embodiments, the blockchain-based data processing apparatus 1 may further include: a second acquisition module 15 and a fourth determination module 16.

The second acquisition module 15 is configured to acquire a resource issue request transmitted by a first service node, the resource issue request including resource detail information, and the resource detail information including an identification of a target object corresponding to the first service node and virtual resources to be issued.

The second acquisition module 15 is further configured to acquire a set of identifications of an issuing object including the identifications of the issuing object and match an object identification in the set of the identifications of the issuing object with the identification of the target object corresponding to the first service node.

The fourth determination module 16 is configured to determine a resource issue permission of the first service node based on the resource attribute of the virtual resources to be issued when there is an object identification same as the identification of the target object in the set of the identifications of the issuing object.

The fourth determination module 16 is further configured to execute the general issuing function in the smart contract according to the resource detail information when the resource issue permission is a permission allowing resource issuing.

The fourth determination module 16 is further configured to issue the virtual resources to be issued to the target object corresponding to the first service node based on the general issuing function.

In some embodiments, the fourth determination module 16 may include: a fourth acquisition unit 161, a third determination unit 162, and a fourth determination unit 163.

The fourth acquisition unit 161 is configured to determine a total number of the virtual resource to be issued according to the resource detail information.

The third determination unit 162 is configured to determine that the resource issue permission of the first service node is the permission allowing resource issuing when the resource attribute of the virtual resources to be issued is a target resource attribute, and the total number of the virtual resources to be issued is at least two, the target resource attribute including the first resource attribute or the second resource attribute.

The fourth determination unit 163 is configured to determine that the resource issue permission is the permission allowing resource issuing when the resource attribute of the virtual resources to be issued is the third resource attribute, and the total number of the virtual resources to be issued is one.

In some embodiments, the fourth determination module 16 may include: an identification generation unit 164, a function execution unit 165, and a resource issue unit 166.

The identification generation unit 164 is configured to generate a token identification to be issued of the virtual resources to be issued based on the identification of the target object, an item identification to be issued corresponding to the virtual resources to be issued, and the total number of the virtual resources to be issued.

The function execution unit 165 is configured to execute the general issuing function in the smart contract based on the token identification to be issued, the identification of the target object corresponding to the first service node, the resource attribute of the virtual resources to be issued, and the total number of the virtual resources to be issued.

The fourth determination module 16 includes:
the resource issue unit 166, configured to issue the virtual resources to be issued having the number of virtual resources issued being the total number of the virtual resources to be issued and carry the token identification to be issued to the target object corresponding to the first service node based on the general issuing function.

In some embodiments, the blockchain-based data processing apparatus 1 may further include: a function call module 17 and a third acquisition module 18.

The second acquisition module 15 is further configured to acquire a resource transfer request transmitted by a second service node, the resource transfer request including an identification of a transferee and the resource identification.

The function call module 17 is configured to call a general transfer function in the smart contract based on the resource transfer request.

The third acquisition module 18 is configured to acquire a first target block associated with the target index identification from the blockchain by the general transfer function when the resource identification includes the target index identification.

The third acquisition module 18 is further configured to acquire an identification of a receiving object associated with the target index identification from the first target block and transfer a target virtual resource held by the receiving object to the transferee when the identification of the receiving object is the same as an object identification corresponding to the second service node.

In some embodiments, the third acquisition module 18 is further configured to acquire A second target blocks associated with a general index identification from the blockchain by the general transfer function when the resource identification includes the general index identification, the A being a positive integer less than or equal to M.

The third acquisition module 18 is further configured to separately acquire an identification of a receiving object to be verified associated with the general index identification from the A second target blocks, each of the second target blocks separately including identifications of different receiving objects to be verified.

The third acquisition module 18 is further configured to transfer the target virtual resource held by an object to be verified corresponding to a same identification to the transferee when there is the identification same as the object identification corresponding to the second service node in the identifications of A receiving objects to be verified.

In some embodiments, the blockchain-based data processing apparatus 1 may further includes a fifth acquisition module 19.

The second acquisition module 15 is further configured to acquire an object registration request transmitted by a third service node, the object registration request including an object identification corresponding to the third service node, an identification address corresponding to the third service node, and an object type.

The function call module 17 is further configured to call a general registration function in the smart contract based on the object registration request.

The fifth determination module 19 is configured to determine the object identification corresponding to the third service node as the identification of the issuing object when the object type is an issuing object type and store the identification of the issuing object and the identification address corresponding to the third service node in association in the blockchain based on the general registration function identifying the object type.

The fifth determination module 19 is further configured to determine that the object identification corresponding to the third service node is an identification of the receiving object when the object type is a receiving object type and store the identification of the receiving object and the identification address corresponding to the third service node in association in the blockchain.

In some embodiments, the blockchain-based data processing apparatus 1 may further includes an information return module 20.

The second acquisition module 15 is further configured to a resource query request transmitted by a query object, the resource query request including the resource identification.

The function call module 17 is further configured to call a general resource query function in the smart contract based on the resource query request.

The fifth determination module 19 is further configured to determine a resource query permission of the query object identification based on the general resource query function.

The information return module 20 is configured to return resource circulation information for the target virtual resource to the query object when the resource query permission is a permission allowing resource querying, the permission allowing resource querying being used for indicating that the query object is the receiving object or an object corresponding to a consensus node in the blockchain.

In an embodiment of this application, the blockchain node may determine the token identification based on the resource reception request. Based on the general callback function, M virtual resources having the token identification issued by the issuing object can be determined in the blockchain. The token attribute corresponding to the token identification can be determined according to the resource attributes of the M virtual resources. If the token attribute is the first token attribute, the target index identification for only identifying the target virtual resource can be determined based on the general callback function. Then the resource identification of the target virtual resource transferred to the receiving object can be determined based on the token identification and the target index identification. In addition, if the token attribute is the second token attribute, the general index identification can be acquired based on the general callback function. Then the resource identification of the target virtual resource transferred to the receiving object can be determined based on the token identification and the general index identification. The transferred virtual resources in the M virtual resources have the same general index identification. It can be seen from the above that for different resource attributes, the embodiments of this application can determine different token attributes (such as the first token attribute and the second token attribute). For the virtual resources having different resource attributes, the corresponding index identifications (such as the target index identification or the general index identification) can be generated. Obviously, the embodiments of this application can distribute virtual resources having different resource attributes in the smart contract. Therefore, the interoperability between the smart contract and a plurality of virtual resources having different resource attributes can be realized. As such, the applicability of the smart contract can be improved.

Figure 11:
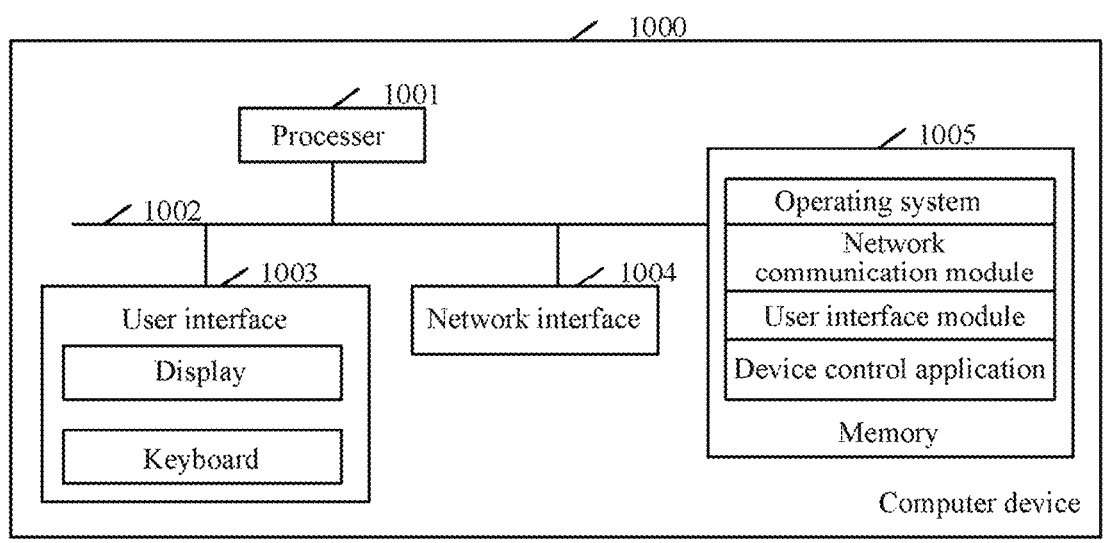
FIG. 11 is a schematic structural diagram of a computer device provided in an embodiment of this application.

In some embodiments, reference may be made to FIG. 11. FIG. 11 is a schematic structural diagram of a computer device provided in an embodiment of this application. As shown in FIG. 11, the computer device 1000 may include: at least one processor 1001, such as a CPU, at least one network interface 1004, a user interface 1003, a memory 1005, and at least one communication bus 1002. The communication bus 1002 is configured to enable connection and communication of these components. The user interface 1003 may include a display and a keyboard. The network interface 1004 may alternatively include standard wired and wireless interfaces (e.g., a WI-FI interface). The memory 1005 may be either a high-speed RAM or a non-volatile memory, such as at least one disk memory. The memory 1005 may alternatively be at least one storage apparatus away from the above processor 1001. As shown in FIG. 11, as a computer storage medium, the memory 1005 may include an operating system, a network communication module, a user interface module, and a device control application.

In the computer device 1000 as shown in FIG. 11, the network interface 1004 may provide a network communication function. The user interface 1003 is mainly configured to provide an interface for a user to input. The processor 1001 may be configured to recall the device control application stored in the memory 1005 to realize the above blockchain-based data processing method provided in the embodiments of this application.

It is understood that the computer device 1000 as described in the embodiments of this application may carry out the description of the blockchain-based data processing method as described in the embodiments corresponding to FIG. 2, FIG. 6, FIG. 8, and FIG. 9, and may also carry out the description of the blockchain-based data processing apparatus 1 as described in the embodiment corresponding to FIG. 10, which will not be described in detail herein. In addition, the advantageous effects using the same method will not be described in detail.

The embodiments of this application further provide a computer-readable storage medium, storing a computer program therein. The computer program includes a program instruction and is loaded by a processor to perform the blockchain-based data processing method provided in the steps of FIG. 2, FIG. 6, FIG. 8, and FIG. 9. For details, reference may be made to the implementations provided in the above steps of FIG. 2, FIG. 6, FIG. 8, and FIG. 9, which will not be described in detail herein. In addition, the advantageous effects using the same method will not be described in detail.

The computer-readable storage medium may be the blockchain-based data processing apparatus provided in any one of the embodiments described above or an internal storage unit of the computer device as described above, such as a hard disk or a memory of the computer device. The computer-readable storage medium may also be an external storage device of the computer device, such as a plug-in hard disk, a smart media card (SMC), a secure digital (SD) card, and a flash card provided on the computer device. The computer-readable storage medium may also include both the internal storage unit and the external storage device of the computer device. The computer-readable storage medium is configured to store the computer program and other programs and data needed by the computer device. The computer-readable storage medium may also be configured to temporarily store the outputted data or the data to be outputted.

The embodiments of this application further provide a computer program product and a computer program, the computer program product or the computer program including a computer instruction stored in a computer-readable storage medium. The processor of the computer device reads the computer instruction from the computer-readable storage medium, and the processor executes the computer instruction to cause the computer device to perform the description of the blockchain-based data processing method in the embodiments corresponding to FIG. 2, FIG. 6, FIG. 8, and FIG. 9, which will not be described in detail herein. In addition, the advantageous effects using the same method will not be described in detail.

In the specification, claims, and the drawings of the embodiments of this application, the terms "first", "second", and the like are intended to distinguish different objects and not to describe a specific order. Furthermore, the terms "include" and any variations thereof are intended to cover a non-exclusive inclusion. For example, the processes, methods, apparatuses, products, or devices that include a series of steps or units are not limited to the listed steps or modules, but, in some embodiments, include unlisted steps or modules or other steps and units inherent to these processes, methods, apparatuses, products, or devices.

Those skilled in the art will recognize that the units, modules and algorithm steps of various examples described in connection with the embodiments disclosed in this application may be implemented in electronic hardware, computer software, or a combination of the two. To clearly illustrate the interchangeability of hardware and software, the composition and steps of each example are described generally based on the function in the above description. Whether these functions are performed in hardware or software depends upon the particular application and design constraint imposed on the technical solution. Skilled artisans may implement the described functions in various ways for each particular application, but such implementation is not be interpreted as departing from the scope of this application.

The method and related apparatus provided in the embodiments of this application are described with reference to the method flowcharts and/or schematic structural diagrams provided in the embodiments of this application. Specifically, each process and/or block in the method flowcharts and/or schematic structural diagrams as well as a combination of the flows and/or blocks in the flowcharts and/or block diagrams are implemented by the computer program instruction. These computer program instructions may be provided for a processor of a general purpose computer, special purpose computer, embedded processor or other programmable data processing devices to produce a machine. As such, the instructions, executed by the processor of the computer or other programmable data processing devices, create apparatuses to implement the functions specified in one or more flows in the flowcharts and/or one or more blocks in the schematic structural diagrams. These computer program instructions may also be stored in a computer-readable memory that can direct a computer or other programmable data processing devices to work in a particular way. As such, the instructions stored in the computer-readable memory produce the products including instruction apparatus, which implement the functions specified in one or more flows in the flowcharts and/or one or more blocks in the schematic structural diagrams. These computer program instructions may also be loaded onto a computer or other programmable data processing devices to perform a series of operation steps on the computer or other programmable devices to produce a process implemented by the computer. As such, the instructions, executed on the computer or other programmable devices, provide steps for implementing the functions specified in one or more flows in the flowcharts and/or one or more blocks in the schematic structural diagrams.

The above disclosure is merely an exemplary embodiment of this application. It is not intended to limit the scope of the claims of this application, and therefore equivalent variations according to the claims of this application are within the scope of this application.

What is claimed is:

1. A blockchain-based data processing method performed by a computer device, the method comprising:
   determining a token identification in response to a resource reception request of a receiving object of a virtual resource, the resource reception request comprising an identification of an issuing object of the virtual resource, an identification of the receiving object and a resource reception number, wherein the issuing object is a developer of a game, the receiving object is a player of the game, the virtual resource is an equipment of the game developed by the developer, the resource reception number indicates a number of equipments of the game currently owned by the player of the game;
   determining M virtual resources having the token identification and issued by the issuing object in a smart contract of a blockchain associated with the game, further including:
      verifying a reception permission of the receiving object for the token identification;
      determining that the reception permission is a permission allowing receiving, the permission allowing receiving characterizing that the M virtual resources having the token identification are not held by the receiving object;
      comparing the resource reception number with a first number threshold value based on the determination that the reception permission is a permission allowing receiving;
      determining that the resource reception number is less than the first number threshold value; and
      calling a general callback function in the smart contract of the blockchain based on the determination that the resource reception number is less than the first number threshold value, and determining, using the general callback function in the smart contract of the blockchain, the M virtual resources having the token identification and issued by the issuing object;
   determining a token attribute corresponding to the token identification based on a resource attribute of the M virtual resources, M being a positive integer;
   determining a resource identification of a target virtual resource transferred from the issuing object to the receiving object based on the token attribute of the token identification;
   calling the general callback function in the smart contract of the blockchain and generating, using the general callback function in the smart contract of the blockchain, a resource reception transaction for the target virtual resource transferred from the issuing object to the receiving object;
   broadcasting the resource reception transaction to a consensus network of the blockchain, wherein the consensus network generates a block for the resource reception transaction performs uplink processing on the block; and transferring the target virtual resource held by the issuing object to the receiving object after the block is successfully uplinked by the consensus network.

2. The method according to claim 1, wherein the determining a resource identification of a target virtual resource transferred from the issuing object to the receiving object based on the token attribute of the token identification comprises:

determining a target index identification identifying the target virtual resource when the token attribute is a first token attribute and determining the resource identification of the target virtual resource transferred from the issuing object to an identification of the receiving object based on the token identification and the target index identification; and acquiring a general index identification when the token attribute is a second token attribute and determining the resource identification of the target virtual resource transferred from the issuing object to the receiving object based on the token identification and the general index identification, the transferred virtual resources in the M virtual resources having a same general index identification.

3. The method according to claim 1, wherein the determining a token identification in response to a resource reception request comprises:

acquiring the resource reception request initiated by the receiving object;

acquiring the token identification associated with an item identification when the resource reception request comprises the item identification; and acquiring a token identification set held by the issuing object when the resource reception request does not comprise the item identification and acquiring the token identification from the token identification set.

4. The method according to claim 1, wherein the determining a token attribute corresponding to the token identification based on a resource attribute of the M virtual resources comprises:

determining that the token attribute corresponding to the token identification is a first token attribute when the resource attribute of the M virtual resources is a first resource attribute, the first resource attribute being used for characterizing that the M is equal to or greater than 2, and the M virtual resources having an only identification property; and determining that the token attribute corresponding to the token identification is a second token attribute when the resource attribute of the M virtual resources is a second resource attribute or a third resource attribute, the second resource attribute being used for characterizing that the M is equal to or greater than 2, the M virtual resources having a same identification property, and the third resource attribute being used for characterizing that the M is equal to 1.

5. The method according to claim 1, further comprising:

acquiring an object registration request transmitted by a third service node, the object registration request comprising an object identification corresponding to the third service node, an identification address corresponding to the third service node, and an object type;

calling a general registration function in the smart contract based on the object registration request;

determining the object identification corresponding to the third service node as the identification of the issuing object when the object type is an issuing object type and storing the identification of the issuing object and the identification address in association in the blockchain based on the general registration function identifying the object type; and determining that the object identification corresponding to the third service node is an identification of the receiving object when the object type is a receiving object type and storing the identification of the receiving object and the identification address corresponding to the third service node in association in the blockchain.

6. The method according to claim 1, further comprising:

acquiring a resource query request transmitted by a query object, the resource query request comprising the resource identification;

calling a general resource query function in the smart contract based on the resource query request;

determining a resource query permission of the query object based on the general resource query function; and returning resource circulation information for the target virtual resource to the query object when the resource query permission is a permission allowing resource querying, the permission allowing resource querying being used for indicating that the query object is the receiving object or an object corresponding to a consensus node in the blockchain.

7. A computer device, comprising a processor, a memory, and a network interface, the processor being connected to the memory and the network interface, the network interface being configured to provide a data communication function, the memory being configured to store a computer program that, when executed by the processor, causes the computer device to perform a blockchain-based data processing method including:

determining a token identification in response to a resource reception request of a receiving object of a virtual resource, the resource reception request comprising an identification of an issuing object of the virtual resource, an identification of the receiving object and a resource reception number, wherein the issuing object is a developer of a game, the receiving object is a player of the game, the virtual resource is an equipment of the game developed by the developer, the resource reception number indicates a number of equipments of the game currently owned by the player of the game;

determining M virtual resources having the token identification and issued by the issuing object in a smart contract of a blockchain associated with the game, further including:

verifying a reception permission of the receiving object for the token identification;

determining that the reception permission is a permission allowing receiving, the permission allowing receiving characterizing that the M virtual resources having the token identification are not held by the receiving object;

comparing the resource reception number with a first number threshold value based on the determination that the reception permission is a permission allowing receiving;

determining that the resource reception number is less than the first number threshold value; and calling a general callback function in the smart contract of the blockchain based on the determination that the resource reception number is less than the first number threshold value, and determining, using the general callback function in the smart contract of the blockchain, the M virtual resources having the token identification and issued by the issuing object;

determining a token attribute corresponding to the token identification based on a resource attribute of the M virtual resources, M being a positive integer;

determining a resource identification of a target virtual resource transferred from the issuing object to the receiving object based on the token attribute of the token identification;

calling the general callback function in the smart contract of the blockchain and generating, using the general callback function in the smart contract of the blockchain, a resource reception transaction for the target virtual resource transferred from the issuing object to the receiving object;

broadcasting the resource reception transaction to a consensus network of the block chain, wherein the consensus network generates a block for the resource reception transaction performs uplink processing on the block; and transferring the target virtual resource held by the issuing object to the receiving object after the block is successfully uplinked by the consensus network.

8. The computer device according to claim 7, wherein the determining a resource identification of a target virtual resource transferred from the issuing object to the receiving object based on the token attribute of the token identification comprises:

determining a target index identification identifying the target virtual resource when the token attribute is a first token attribute and determining the resource identification of the target virtual resource transferred from the issuing object to an identification of the receiving object based on the token identification and the target index identification; and acquiring a general index identification when the token attribute is a second token attribute and determining the resource identification of the target virtual resource transferred from the issuing object to the receiving object based on the token identification and the general index identification, the transferred virtual resources in the M virtual resources having a same general index identification.

9. The computer device according to claim 7, wherein the determining a token identification in response to a resource reception request comprises:

acquiring the resource reception request initiated by the receiving object;

acquiring the token identification associated with an item identification when the resource reception request comprises the item identification; and acquiring a token identification set held by the issuing object when the resource reception request does not comprise the item identification and acquiring the token identification from the token identification set.

10. The computer device according to claim 7, wherein the determining a token attribute corresponding to the token identification based on a resource attribute of the M virtual resources comprises:

determining that the token attribute corresponding to the token identification is a first token attribute when the resource attribute of the M virtual resources is a first resource attribute, the first resource attribute being used for characterizing that the M is equal to or greater than 2, and the M virtual resources having an only identification property; and determining that the token attribute corresponding to the token identification is a second token attribute when the resource attribute of the M virtual resources is a second resource attribute or a third resource attribute, the second resource attribute being used for characterizing that the M is equal to or greater than 2, the M virtual resources having a same identification property, and the third resource attribute being used for characterizing that the M is equal to 1.

11. The computer device according to claim 7, wherein the method further comprises:

acquiring an object registration request transmitted by a third service node, the object registration request comprising an object identification corresponding to the third service node, an identification address corresponding to the third service node, and an object type;

calling a general registration function in the smart contract based on the object registration request;

determining the object identification corresponding to the third service node as the identification of the issuing object when the object type is an issuing object type and storing the identification of the issuing object and the identification address in association in the blockchain based on the general registration function identifying the object type; and determining that the object identification corresponding to the third service node is an identification of the receiving object when the object type is a receiving object type and storing the identification of the receiving object and the identification address corresponding to the third service node in association in the blockchain.

12. The computer device according to claim 7, wherein the method further comprises:

acquiring a resource query request transmitted by a query object, the resource query request comprising the resource identification;

calling a general resource query function in the smart contract based on the resource query request;

determining a resource query permission of the query object based on the general resource query function; and returning resource circulation information for the target virtual resource to the query object when the resource query permission is a permission allowing resource querying, the permission allowing resource querying being used for indicating that the query object is the receiving object or an object corresponding to a consensus node in the blockchain.

13. A non-transitory computer-readable storage medium, storing a computer program therein, the computer program being loaded and executed by a processor of a computer device and causing the computer device to perform a blockchain-based data processing method including:

determining a token identification in response to a resource reception request of a receiving object of a virtual resource, the resource reception request comprising an identification of an issuing object of the virtual resource, an identification of the receiving object and a resource reception number, wherein the issuing object is a developer of a game, the receiving object is a player of the game, the virtual resource is an equipment of the game developed by the developer, the resource reception number indicates a number of equipments of the game currently owned by the player of the game;

determining M virtual resources having the token identification and issued by the issuing object in a smart contract of a blockchain associated with the game, further including:
  verifying a reception permission of the receiving object for the token identification;
  determining that the reception permission is a permission allowing receiving, the permission allowing receiving characterizing that the M virtual resources having the token identification are not held by the receiving object;
  comparing the resource reception number with a first number threshold value based on the determination that the reception permission is a permission allowing receiving;
  determining that the resource reception number is less than the first number threshold value; and
  calling a general callback function in the smart contract of the blockchain based on the determination that the resource reception number is less than the first number threshold value, and determining, using the general callback function in the smart contract of the blockchain, the M virtual resources having the token identification and issued by the issuing object;
determining a token attribute corresponding to the token identification based on a resource attribute of the M virtual resources, M being a positive integer;
determining a resource identification of a target virtual resource transferred from the issuing object to the receiving object based on the token attribute of the token identification;
calling the general callback function in the smart contract of the blockchain and generating, using the general callback function in the smart contract of the blockchain, a resource reception transaction for the target virtual resource transferred from the issuing object to the receiving object;
broadcasting the resource reception transaction to a consensus network of the block chain, wherein the consensus network generates a block for the resource reception transaction performs uplink processing on the block; and
transferring the target virtual resource held by the issuing object to the receiving object after the block is successfully uplinked by the consensus network.

14. The non-transitory computer-readable storage medium according to claim 13, wherein the determining a resource identification of a target virtual resource transferred from the issuing object to the receiving object based on the token attribute of the token identification comprises:
  determining a target index identification identifying the target virtual resource when the token attribute is a first token attribute and determining the resource identification of the target virtual resource transferred from the issuing object to an identification of the receiving object based on the token identification and the target index identification; and
  acquiring a general index identification when the token attribute is a second token attribute and determining the resource identification of the target virtual resource transferred from the issuing object to the receiving object based on the token identification and the general index identification, the transferred virtual resources in the M virtual resources having a same general index identification.

15. The non-transitory computer-readable storage medium according to claim 13, wherein the determining a token identification in response to a resource reception request comprises:
  acquiring the resource reception request initiated by the receiving object;
  acquiring the token identification associated with an item identification when the resource reception request comprises the item identification; and
  acquiring a token identification set held by the issuing object when the resource reception request does not comprise the item identification and acquiring the token identification from the token identification set.

16. The non-transitory computer-readable storage medium according to claim 13, wherein the method further comprises:
  acquiring an object registration request transmitted by a third service node, the object registration request comprising an object identification corresponding to the third service node, an identification address corresponding to the third service node, and an object type;
  calling a general registration function in the smart contract based on the object registration request;
  determining the object identification corresponding to the third service node as the identification of the issuing object when the object type is an issuing object type and storing the identification of the issuing object and the identification address in association in the blockchain based on the general registration function identifying the object type; and
  determining that the object identification corresponding to the third service node is an identification of the receiving object when the object type is a receiving object type and storing the identification of the receiving object and the identification address corresponding to the third service node in association in the blockchain.

17. The non-transitory computer-readable storage medium according to claim 13, wherein the method further comprises:
  acquiring a resource query request transmitted by a query object, the resource query request comprising the resource identification;
  calling a general resource query function in the smart contract based on the resource query request;
  determining a resource query permission of the query object based on the general resource query function; and
  returning resource circulation information for the target virtual resource to the query object when the resource query permission is a permission allowing resource querying, the permission allowing resource querying being used for indicating that the query object is the receiving object or an object corresponding to a consensus node in the blockchain.

* * * * *